US012440752B2

(12) United States Patent
Okamura

(10) Patent No.: US 12,440,752 B2
(45) Date of Patent: Oct. 14, 2025

(54) RECORDING MEDIUM HAVING RECORDED PROGRAM

(71) Applicant: Konami Digital Entertainment Co., Ltd., Tokyo (JP)

(72) Inventor: Noriaki Okamura, Tokyo (JP)

(73) Assignee: KONAMI DIGITAL ENTERTAINMENT CO., LTD., Tokyo (JP)

(*) Notice: Subject to any disclaimer, the term of this patent is extended or adjusted under 35 U.S.C. 154(b) by 436 days.

(21) Appl. No.: 17/001,892

(22) Filed: Aug. 25, 2020

(65) Prior Publication Data
US 2020/0384350 A1  Dec. 10, 2020

Related U.S. Application Data

(63) Continuation of application No. PCT/JP2019/003592, filed on Feb. 1, 2019.

(30) Foreign Application Priority Data

Mar. 29, 2018  (JP) ................... 2018-064162
Mar. 29, 2018  (JP) ................... 2018-064164

(51) Int. Cl.
A63F 13/214  (2014.01)
A63F 13/285  (2014.01)
(Continued)

(52) U.S. Cl.
CPC .......... *A63F 13/214* (2014.09); *A63F 13/285* (2014.09); *G06F 3/016* (2013.01); *G06F 3/04186* (2019.05); *G06F 2203/04105* (2013.01)

(58) Field of Classification Search
None
See application file for complete search history.

(56) References Cited

U.S. PATENT DOCUMENTS 8,274,484 B2 * 9/2012 Baudisch ............ G06F 3/04883
345/173
9,244,562 B1 * 1/2016 Rosenberg .......... G06F 3/04883
(Continued)

FOREIGN PATENT DOCUMENTS

CN   102214038 A  * 10/2011 ............. G06F 3/016
CN   103135810 A  *  6/2013
(Continued)

OTHER PUBLICATIONS

Communication dated Jun. 13, 2022 from the Korean Patent Office in Korean Application No. 10-2020-7025326.
(Continued)

*Primary Examiner* — Xuan M Thai
*Assistant Examiner* — Andrew Bodendorf
(74) *Attorney, Agent, or Firm* — Sughrue Mion, PLLC

(57) ABSTRACT

A non-transitory computer-readable recording medium has recorded therein a program for causing a processor to function as: a touch position information acquirer configured to acquire touch position information regarding a touch position on a touch panel; a pressure information acquirer configured to acquire pressure information regarding a pressure applied to the touch panel; an input presence determiner configured to determine, based on the pressure information acquired by the pressure information acquirer, whether input of an instruction regarding a game is present; and an instruction determiner configured to determine a direction regarding the game indicated by the instruction, based on the touch position information acquired by the touch position information acquirer, when a determination result by the input presence determiner is affirmative.

5 Claims, 16 Drawing Sheets

(51) Int. Cl.
  *G06F 3/01* (2006.01)
  *G06F 3/041* (2006.01)

(56) References Cited

U.S. PATENT DOCUMENTS

| | | | |
|---|---|---|---|
| 9,323,360 B2 | 4/2016 | Lee | |
| 9,772,743 B1* | 9/2017 | Mueller | G06F 3/04886 |
| 10,078,410 B1* | 9/2018 | Isaak | G06F 3/048 |
| 10,156,921 B1* | 12/2018 | Smith | G06F 3/048 |
| 10,268,364 B2* | 4/2019 | Park | G06F 3/04886 |
| 10,386,960 B1* | 8/2019 | Smith | G06F 3/0412 |
| 10,410,425 B1* | 9/2019 | Patel | A63F 13/25 |
| 10,725,648 B2* | 7/2020 | Pourcyrous | G06F 3/0488 |
| 2001/0036299 A1 | 11/2001 | Senior | |
| 2003/0122779 A1* | 7/2003 | Martin | G06F 1/1662 345/156 |
| 2004/0219978 A1* | 11/2004 | Teramoto | A63F 13/45 463/6 |
| 2006/0109252 A1* | 5/2006 | Kolmykov-Zotov | G06F 3/041 345/173 |
| 2006/0128468 A1* | 6/2006 | Yoshikawa | A63F 13/92 463/36 |
| 2007/0091066 A1* | 4/2007 | Harley | G06F 3/03548 345/157 |
| 2009/0051667 A1* | 2/2009 | Park | G06F 3/04886 345/173 |
| 2009/0103853 A1 | 4/2009 | Daniel | |
| 2010/0083109 A1* | 4/2010 | Tse | A63F 13/843 715/755 |
| 2010/0088654 A1* | 4/2010 | Henhoeffer | G06F 3/04883 715/863 |
| 2010/0134428 A1* | 6/2010 | Oh | G06F 3/0414 345/173 |
| 2011/0050576 A1* | 3/2011 | Forutanpour | G06F 3/04886 345/173 |
| 2012/0088553 A1* | 4/2012 | Nunes | G06F 3/0485 345/173 |
| 2012/0169610 A1* | 7/2012 | Berkes | G06F 3/04166 345/173 |
| 2012/0212429 A1* | 8/2012 | Okura | A63F 13/42 345/173 |
| 2012/0327106 A1* | 12/2012 | Won | A63F 13/843 345/173 |
| 2013/0061176 A1* | 3/2013 | Takehiro | G06F 1/1626 715/823 |
| 2013/0215040 A1* | 8/2013 | Bose | G06F 3/04883 345/173 |
| 2013/0271495 A1* | 10/2013 | Nguyen | G06F 3/017 345/649 |
| 2013/0314358 A1 | 11/2013 | Takano | |
| 2013/0332892 A1 | 12/2013 | Matsuki | |
| 2014/0098095 A1 | 4/2014 | Lee et al. | |
| 2014/0168093 A1 | 6/2014 | Lawrence | |
| 2014/0243092 A1* | 8/2014 | Morita | A63F 13/95 463/31 |
| 2014/0278765 A1 | 9/2014 | Chiu | |
| 2014/0368436 A1* | 12/2014 | Abzarian | G06F 3/017 345/173 |
| 2015/0084873 A1* | 3/2015 | Hagenbuch | G06F 3/0416 345/173 |
| 2015/0169165 A1* | 6/2015 | Bacus | G06F 3/04883 715/863 |
| 2015/0301684 A1* | 10/2015 | Shimamura | G06F 3/04186 345/174 |
| 2016/0063828 A1* | 3/2016 | Moussette | G06F 11/0745 340/691.5 |
| 2016/0179245 A1 | 6/2016 | Johansson et al. | |
| 2016/0188181 A1* | 6/2016 | Smith | G06F 3/04886 715/765 |
| 2016/0317915 A1* | 11/2016 | Onda | A63F 13/2145 |
| 2017/0083096 A1 | 3/2017 | Rihn et al. | |
| 2017/0090749 A1* | 3/2017 | Marsden | G06F 3/04886 |
| 2017/0192599 A1* | 7/2017 | Jin | G04G 21/08 |
| 2017/0255269 A1* | 9/2017 | Yang | G06F 3/048 |
| 2017/0351398 A1* | 12/2017 | Oikawa | G06F 3/04883 |
| 2018/0173368 A1* | 6/2018 | Zhang | G06F 3/0482 |
| 2018/0284964 A1 | 10/2018 | Kang et al. | |
| 2018/0373376 A1* | 12/2018 | Kurabayashi | A63F 13/218 |
| 2019/0012059 A1* | 1/2019 | Kwon | G06F 3/0481 |
| 2019/0034075 A1* | 1/2019 | Smochko | G06F 3/04842 |
| 2019/0114069 A1* | 4/2019 | Wang | G06F 3/0414 |
| 2019/0146627 A1* | 5/2019 | Schediwy | H03K 17/9625 345/174 |
| 2019/0260864 A1* | 8/2019 | Du | G06F 3/0488 |
| 2019/0265834 A1* | 8/2019 | Rosenberg | G06F 3/03543 |
| 2019/0294325 A1* | 9/2019 | Ohki | G06F 3/0416 |
| 2019/0310723 A1* | 10/2019 | Kang | H04W 4/00 |
| 2019/0332659 A1* | 10/2019 | Yang | G06F 3/0481 |
| 2020/0033987 A1* | 1/2020 | Fu | G06F 3/0414 |
| 2020/0034033 A1* | 1/2020 | Chaudhri | H04L 51/063 |
| 2020/0155941 A1* | 5/2020 | Ito | A63F 13/2145 |
| 2020/0319600 A1 | 10/2020 | Hachiya et al. | |
| 2020/0356216 A1* | 11/2020 | Yamamoto | G06F 3/0414 |
| 2021/0141484 A1* | 5/2021 | Ogita | G06F 1/1626 |
| 2021/0278947 A1* | 9/2021 | Choi | G06F 3/04144 |

FOREIGN PATENT DOCUMENTS

| | | | | |
|---|---|---|---|---|
| CN | 105022561 A | * | 11/2015 | |
| CN | 105468279 A | * | 4/2016 | |
| CN | 105677090 A | * | 6/2016 | |
| CN | 106681553 A | * | 5/2017 | |
| JP | 2010-533336 A | | 10/2010 | |
| JP | 2011-186880 A | | 9/2011 | |
| JP | 2013-3949 A | | 1/2013 | |
| JP | 2013-58136 A | | 3/2013 | |
| JP | 2013-73518 A | | 4/2013 | |
| JP | 2014-044455 A | | 3/2014 | |
| JP | 2015-167758 A | | 9/2015 | |
| JP | 2016-41277 A | | 3/2016 | |
| JP | 2016212605 A | * | 12/2016 | |
| JP | 2017-91494 A | | 5/2017 | |
| JP | 2017-119080 A | | 7/2017 | |
| KR | 10-2009-0020040 A | | 2/2009 | |
| KR | 20110068938 A | * | 12/2010 | |
| KR | 10-2013-0133224 A | | 12/2013 | |
| KR | 101570967 B1 | * | 9/2014 | G06F 3/016 |
| KR | 10-2016-0067670 A | | 6/2016 | |
| KR | 20180014575 A | * | 8/2016 | |
| KR | 10-2016-0110524 A | | 9/2016 | |

OTHER PUBLICATIONS

Advisory Action dated Nov. 30, 2021, issued by the U.S. Patent & Trademark Office in U.S. Appl. No. 17/001,811.
Office Action dated Nov. 29, 2021, issued by the Korean Intellectual Property Office in application No. 10-2020-7025326.
Office Action dated Feb. 15, 2022, issued by the Korean Intellectual Property Office in application No. 10-2020-7025325.
Final Office Action dated Sep. 21, 2021 issued in U.S. Appl. No. 17/001,811.
Communication dated Dec. 1, 2020 from the Japanese Patent Office in Application No. 2018-064163.
International Search Report dated Apr. 16, 2019 in application No. PCT/JP2019/003592.
Written Opinion of the International Searching Authority dated Apr. 16, 2019, in application No. PCT/JP2019/003592.
Communication dated Apr. 28, 2020 from the Japanese Patent office in application No. 2018-064162.
Communication dated Apr. 28, 2020, from the Japanese Patent Office in application No. 2018-064164.
International Search Report dated May 7, 2019, in application No. PCT/JP2019/008549.
Written opinion of the International Searching Authority dated May 7, 2019, in application No. PCT/JP2019/008549.
Communication dated Jun. 23, 2020, from the Japanese Patent Office in application No. 2018-064163.
Communication dated Feb. 24, 2021, issued by the Japanese Patent Office in application No. 2018- 064163.

(56) References Cited

OTHER PUBLICATIONS

Communication dated Apr. 14, 2021, issued by the U.S. Patent and Trademark Office in U.S. Appl. No. 17/001,811.
Office Action Issued Feb. 28, 2022 in U.S. Appl. No. 17/001,811.
Office Action issued Dec. 23, 2022 in Korean Application No. 10-2020-7025326.
Chinese Office Action issued Oct. 30, 2023 in Application No. 201980016794.1.
Chinese Office Action issued Oct. 28, 2023 in Application No. 201980016458.7.
Chinese Office Action issued Apr. 3, 2024 in Application No. 201980016794.1.

\* cited by examiner

| AREA | DETERMINATION RESULT |
|---|---|
| FROM G1 TO G2 INCLUSIVE | UP |
| FROM G3 TO G4 INCLUSIVE | NEUTRAL |
| FROM G5 TO G6 INCLUSIVE | RIGHT |
| FROM G7 TO G8 INCLUSIVE | LEFT |
| FROM G9 TO G10 INCLUSIVE | DOWN |

| ASPECT RATIO | DETERMINATION RESULT |
|---|---|
| FROM H1 TO H2 INCLUSIVE | NEUTRAL |
| FROM H3 TO H4 INCLUSIVE | UP |
| FROM H5 TO H6 INCLUSIVE | DOWN |
| FROM H7 TO H8 INCLUSIVE | LEFT |
| FROM H9 TO H10 INCLUSIVE | RIGHT |

RECORDING MEDIUM HAVING RECORDED PROGRAM

CROSS REFERENCE TO RELATED APPLICATIONS

This application is a Continuation application of PCT Application No. PCT/JP2019/003592, filed on Feb. 1, 2019, and is based on, and claims priority from, Japanese Patent Application No. 2018-064162, filed on Mar. 29, 2018, and Japanese Patent Application No. 2018-064164, filed on Mar. 29, 2018, the entire contents of each of which are incorporated herein by reference.

BACKGROUND OF THE INVENTION

Field of the Invention

The present invention relates to an information processing apparatus and to a recording medium having a program for the information processing apparatus recorded therein.

Description of Related Art

Devices are widely used that receive input of an instruction from a user by using a touch panel (see Japanese Patent Application Laid-Open Publication No. 2014-44455). Such a device receives an instruction from the user corresponding to a touch position on the touch panel.

When a user does not intend to input an instruction by a touch panel, for example, the user needs to place the user's digit in an area in which input of an instruction cannot be input on the touch panel (hereinafter, "neutral area"). However, when the touch position on the touch panel deviates from the neutral area, an unintended instruction may be input via the touch panel.

SUMMARY

The present invention has been made in view of the problem described above, and it has as its object provision of a technique that can prevent occurrence of input of an unintended instruction via a touch panel, regardless of a position touched on the touch panel.

To achieve the stated object, a non-transitory computer-readable recording medium according to an aspect of the present invention has recorded therein a program for causing a processor to function as: a touch position information acquirer configured to acquire touch position information regarding a touch position on a touch panel; a pressure information acquirer configured to acquire pressure information regarding a pressure applied to the touch panel; an input presence determiner configured to determine, based on the pressure information acquired by the pressure information acquirer, whether input of an instruction regarding a game is present; and an instruction determiner configured to determine a direction regarding the game indicated by the instruction, based on the touch position information acquired by the touch position information acquirer, when a determination result by the input presence determiner is affirmative.

An information processing apparatus according to another aspect of the present invention includes a touch position information acquirer configured to acquire touch position information regarding a touch position on a touch panel, a pressure information acquirer configured to acquire pressure information regarding a pressure applied to the touch panel, an input presence determiner configured to determine, based on the pressure information acquired by the pressure information acquirer, whether input of an instruction regarding a game is present, and an instruction determiner configured to determine a direction regarding the game indicated by the instruction, based on the touch position information acquired by the touch position information acquirer, when a determination result by the input presence determiner is affirmative.

A non-transitory computer-readable recording medium according to still another aspect of the present invention has recorded therein a program that causes a processor to function as a touch position information acquirer configured to acquire touch position information regarding a touch position on a touch panel, the touch panel including a first area for inputting a first instruction regarding a game and a second area for inputting a second instruction regarding the game, a pressure information acquirer configured to acquire pressure information regarding a pressure applied to the touch panel, a first determiner configured to determine, based on the touch position information acquired by the touch position information acquirer, whether input of the first instruction is present, and a second determiner configured to determine whether input of the second instruction is present, based on both the pressure information, which is acquired by the pressure information acquirer at a time when the touch position information acquired by the touch position information acquirer indicates that a touch to the second area is present, and a determination result by the first determiner based on the touch position information.

A non-transitory computer-readable recording medium according to still another aspect of the present invention has recorded therein a program that causes a processor to function as a touch position information acquirer configured to acquire touch position information regarding a touch position on a touch panel, the touch panel including a first area for inputting a first instruction regarding a game and a second area for inputting a second instruction regarding the game, a pressure information acquirer configured to acquire pressure information regarding a pressure applied to the touch panel, a first determiner configured to determine, based on the touch position information acquired by the touch position information acquirer, whether input of the first instruction is present, and a second determiner configured to determine, when a determination result by the first determiner based on the touch position information indicative of a presence of a touch to the second area is negative, whether input of the second instruction is present, based on the pressure information acquired by the pressure information acquirer at a time when the touch position information acquirer acquires the touch position information, the game is not affected by the touch to the second area, during a period in which the determination result by the first determiner based on the touch position information indicative of the presence of the touch to the second area is affirmative.

An information processing apparatus includes a touch position information acquirer configured to acquire touch position information regarding a touch position on a touch panel, the touch panel including a first area for inputting a first instruction regarding a game and a second area for inputting a second instruction regarding the game, a pressure information acquirer configured to acquire pressure information regarding a pressure applied to the touch panel, a first determiner configured to determine, based on the touch position information acquired by the touch position information acquirer, whether input of the first instruction is present, and a second determiner configured to determine whether input of the second instruction is present, based on both the pressure information, which is acquired by the pressure information acquirer at a time when the touch position information acquired by the touch position information acquirer indicates that a touch to the second area is present, and a determination result by the first determiner based on the touch position information.

An information processing apparatus according to still another aspect of the present invention includes a touch position information acquirer configured to acquire touch position information regarding a touch position on a touch panel, the touch panel including a first area for inputting a first instruction regarding a game and a second area for inputting a second instruction regarding the game, a pressure information acquirer configured to acquire pressure information regarding a pressure applied to the touch panel, a first determiner configured to determine, based on the touch position information acquired by the touch position information acquirer, whether input of the first instruction is present, and a second determiner configured to determine, when a determination result by the first determiner based on the touch position information indicative of a presence of a touch at the second area is negative, whether input of the second instruction is present based on the pressure information acquired by the pressure information acquirer at the time when the touch position information acquirer acquires the touch position information, and to suspend determination of whether input of the second instruction is present, during a period in which the determination result by the first determiner based on the touch position information indicative of the presence of the touch to the second area is affirmative.

DESCRIPTION OF EMBODIMENTS

A: First Embodiment

Figure 1:
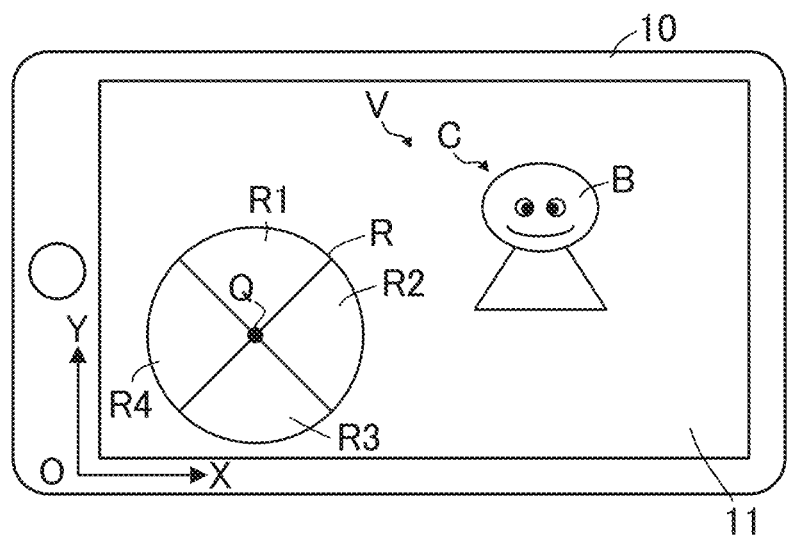
FIG. 1 is a diagram illustrating an external appearance of an information processing apparatus 10 according to a first embodiment 1.

FIG. 1 is a diagram illustrating an external appearance of an information processing apparatus 10 according to a first embodiment. The information processing apparatus 10 is a mobile information processing apparatus, for example, a smartphone, a tablet terminal, a portable game apparatus, or the like. The information processing apparatus 10 includes a touch panel 11.

The touch panel 11 is an apparatus in which a display that displays an image is integrated with an inputter (not shown) that receives input of an instruction. The touch panel 11 displays various images. The touch panel 11 detects a touch position by using, for example, an electrostatic capacity determined by an object coining in contact with the touch panel 11 and the touch panel 11. The touch panel 11 outputs touch position information regarding the touched position on the touch panel 11. The touch position information indicates at least a touch position on the touch panel 11.

As illustrated in FIG. 1, a touch position on the touch panel 11 is defined by an X-axis and a Y-axis that are orthogonal to each other at an origin 0 set on the touch panel 11. The X-axis and the Y-axis are lines parallel to the touch panel 11. The X-axis corresponds to a horizontal direction of the touch panel 11, and the Y-axis corresponds to a vertical direction thereof. In other words, the X-axis corresponds to a lateral direction of the touch panel 11, and the Y-axis corresponds to a longitudinal direction of the touch panel 11.

The information processing apparatus 10 displays an image of a game on the touch panel 11, by performing an application program of the game.

In FIG. 1, the touch panel 11 displays an image indicative of a virtual space V regarding the game as an image of the game. A character C is arranged in the virtual space V. FIG. 1 illustrates a state in which a face B of the character C faces the front. The image of the game is not limited to the image illustrated in FIG. 1 and can be appropriately changed.

An operation area R is set on the touch panel 11. The operation area R is an example of an area in which an operation is received. The operation area R is also referred to as "virtual pad".

The operation area R is an example of an area provided in a mode visible on the touch panel 11, in order to input an instruction regarding the game.

The "area provided in a mode visible on the touch panel 11" may be a virtual direction key for upward, downward, rightward, and leftward directions displayed on the touch panel 11 or a virtual cross key displayed on the touch panel 11, for example.

The "direction key for upward, downward, rightward, and leftward directions" may have an up key for specifying an upward direction, a down key for specifying a downward direction, a right key for specifying a rightward direction, and a left key for specifying a leftward direction. In this case, the up key, the down key, the right key, and the left key may be in contact with each other, or may be arranged with a gap therebetween.

The operation area R may be a virtual area provided in a mode not visible on the touch panel 11 for inputting an instruction regarding a game.

The operation area R is used to input an instruction regarding the direction of the face B (hereinafter, "face direction instruction") to the touch panel 11. The face direction instruction is an example of an instruction for the game.

An example of the face direction instruction is an upward instruction indicating an upward direction as the direction of the face B. Another example of the face direction instruction may be a downward instruction indicating a downward direction, a rightward instruction indicating a rightward direction, or a leftward instruction indicating a leftward direction. The direction indicated by the face direction instruction is an example of a direction regarding the game. When a face direction instruction is input to the touch panel 11, the information processing apparatus 10 sets the direction of the face B to the direction indicated by the face direction instruction. Input of the face direction instruction is performed by, for example, a thumb of a user.

The information processing apparatus 10 determines whether a face direction instruction has been input based on a pressure applied to the touch panel 11.

For example, when the pressure applied to the touch panel 11 is equal to or greater than a first threshold, the information processing apparatus 10 determines that a face direction instruction has been input. On the other hand, when the pressure applied to the touch panel 11 is less than the first threshold, the information processing apparatus 10 determines that a face direction instruction has not been input, even if a touch to the operation area R is present. In the following descriptions, a state in which a face direction instruction has not been input is referred to as a "neutral state".

The first threshold is a positive number. The first threshold is a threshold for determining the presence of input. For example, the first threshold may be a fixed value, a value changed by a user, or a value changed in accordance with a touch operation with respect to the touch panel 11.

"To change the first threshold in accordance with a touch operation with respect to the touch panel 11" means, as an example, that when a plurality of touches (hereinafter, "multiple touches") are performed with respect to the touch panel 11, the first threshold is set to be greater than that in a case in which multiple touches are not performed.

Figure 2:
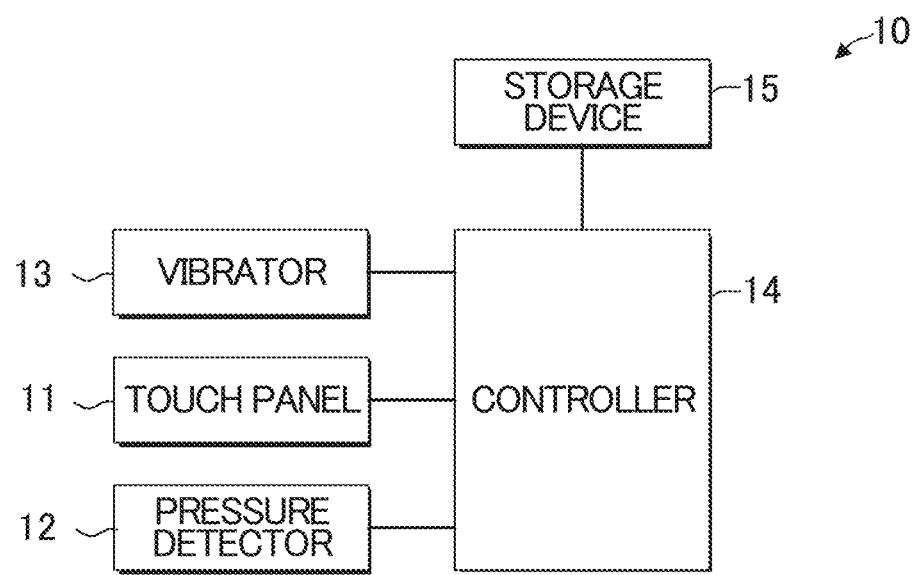
FIG. 2 is a block diagram illustrating an example of a configuration of the information processing apparatus 10.

FIG. 2 is a block diagram illustrating an example of a configuration of the information processing apparatus 10.

The information processing apparatus 10 includes a pressure detector 12, a vibrator 13, a controller 14, and a storage device 15 in addition to the touch panel 11 described above.

The pressure detector 12 detects a pressure applied to the touch panel 11. The pressure detector 12 outputs pressure information regarding the pressure applied to the touch panel 11. The pressure information indicates the pressure applied to the touch panel 11.

When a user pushes the touch panel 11 with the user's thumb, the touch panel 11 slightly bends as a whole. The pressure detector 12 detects the degree of bending on the touch panel 11, to detect the pressure applied to the touch panel 11. This enables the pressure detector 12 to detect the pressure applied to the touch panel 11. The pressure detector 12 is also referred to as a "sensor that outputs pressure information".

The vibrator 13 vibrates the touch panel 11. The vibrator 13 is, for example, a vibration motor that generates vibrations by rotation. When the vibrator 13 vibrates, the entire information processing apparatus 10, including the touch panel 11 vibrates.

The controller 14 is a processor such as a Central Processing Unit (CPU). The controller 14 integrally controls respective elements of the information processing apparatus 10.

The storage device 15 is an example of a recording medium that can be read by a computer such as a processor (for example, a computer-readable non-transitory recording medium). The storage device 15 has stored therein a program to be executed by the controller 14 (the application program of the game described above) and various types of data to be used by the controller 14. For example, the storage device 15 is configured by a well-known recording medium such as a magnetic recording medium or a semiconductor recording medium, or a combination of a plurality of types of recording media.

Figure 3:
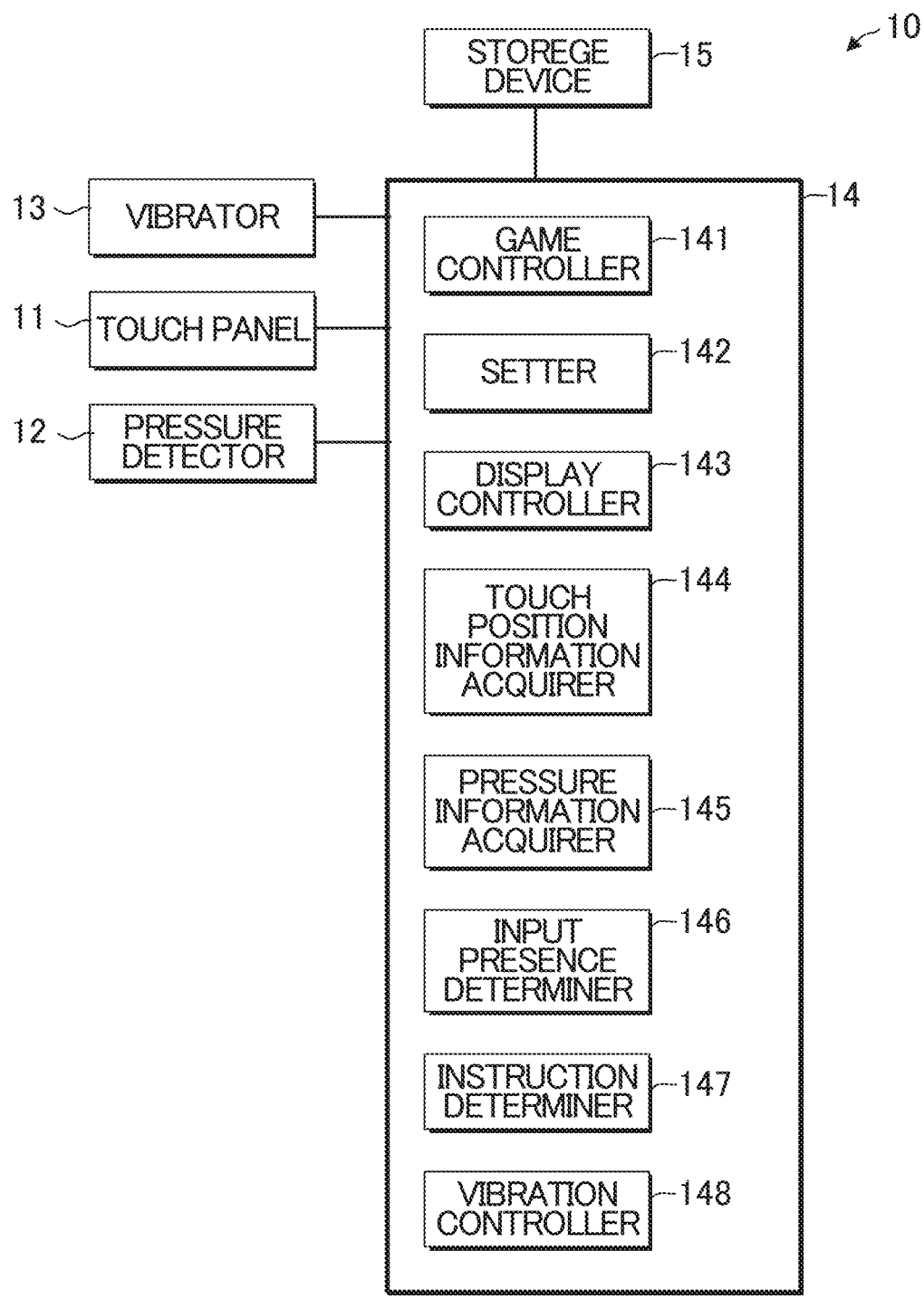
FIG. 3 is a block diagram illustrating an example of a functional configuration of the information processing apparatus 10.

The controller 14 executes the program stored in the storage device 15, thereby functioning as a game controller 141, a setter 142, a display controller 143, a touch position information acquirer 144, a pressure information acquirer 145, an input presence determiner 146, an instruction determiner 147, and a vibration controller 148, as illustrated in FIG. 3. Some or all of the functions of the controller 14 may be realized by dedicated electronic circuitry.

The game controller 141 controls the progress of the game. For example, when input of a face direction instruction is present, the game controller 141 progresses the game in accordance with the face direction instruction. In the neutral state, the game controller 141 sets the direction of the face B to a direction associated beforehand with the neutral state (for example, the front direction as illustrated in FIG.

1). The game controller 141 generates game image information indicative of an image according to the progress status of the game.

The setter 142 sets an operation area R on the touch panel 11. In the first embodiment, the setter 142 fixes the operation area R to a predetermined position.

The operation area R has a reference point Q, an upward area R1, a rightward area R2, a downward area R3, and a leftward area R4, as illustrated in FIG. 1.

The reference point Q is the reference of the position in the operation area R. The reference point Q is set, for example, at a position of the center of gravity of the operation area R. The reference point Q may be set at a position different from the position of the center of gravity of the operation area R.

The upward area R1 is set to a position above the reference point Q on the touch panel 11. The downward area R3 is set to a position below the reference point Q on the touch panel 11. The rightward area R2 is set to a position on the right of the reference point Q on the touch panel 11. The leftward area R4 is set to a position on the left of the reference point Q on the touch panel 11.

The upward area R1 is associated with an upward direction on the touch panel 11. The rightward area R2, the downward area R3, and the leftward area R4 are associated with the rightward direction, the downward direction, and the leftward direction respectively on the touch panel 11.

The display controller 143 displays an image in which an image of the operation area R is superimposed on an image of the game according to the game image information generated by the game controller 141 (hereinafter, "superimposed image") on the touch panel 11.

The touch position information acquirer 144 acquires touch position information output from the touch panel 11.

The pressure information acquirer 145 acquires pressure information output from the pressure detector 12.

The input presence determiner 146 determines whether input of a face direction instruction is present, on the basis of the pressure information acquired by the pressure information acquirer 145. In the following descriptions, the "pressure information" represents "pressure information acquired by the pressure information acquirer 145", unless otherwise described.

When a determination result by the input presence determiner 146 is affirmative (when input of a face direction instruction is present), the instruction determiner 147 determines a direction indicated by the face direction instruction, on the basis of the touch position information acquired by the touch position information acquirer 144. In the following descriptions, the "touch position information" represents "touch position information acquired by the touch position information acquirer 144", unless otherwise described.

For example, the instruction determiner 147 determines a direction indicated by the face direction instruction, on the basis of a positional relationship between a touch position indicated by the touch position information and the operation area R. In the following descriptions, the "touch position" represents a "touch position indicated by the touch position information", unless otherwise described.

The game controller 141 controls the progress of the game on the basis of a determination result by the input presence determiner 146 and a determination result by the instruction determiner 147.

The vibration controller 148 controls the vibrator 13. For example, when a determination result by the instruction determiner 147 changes, the vibration controller 148 vibrates the vibrator 13. The vibration controller 148 may vibrate the vibrator 13, in a situation in which a determination result by the input presence determiner 146 changes.

Figure 4:
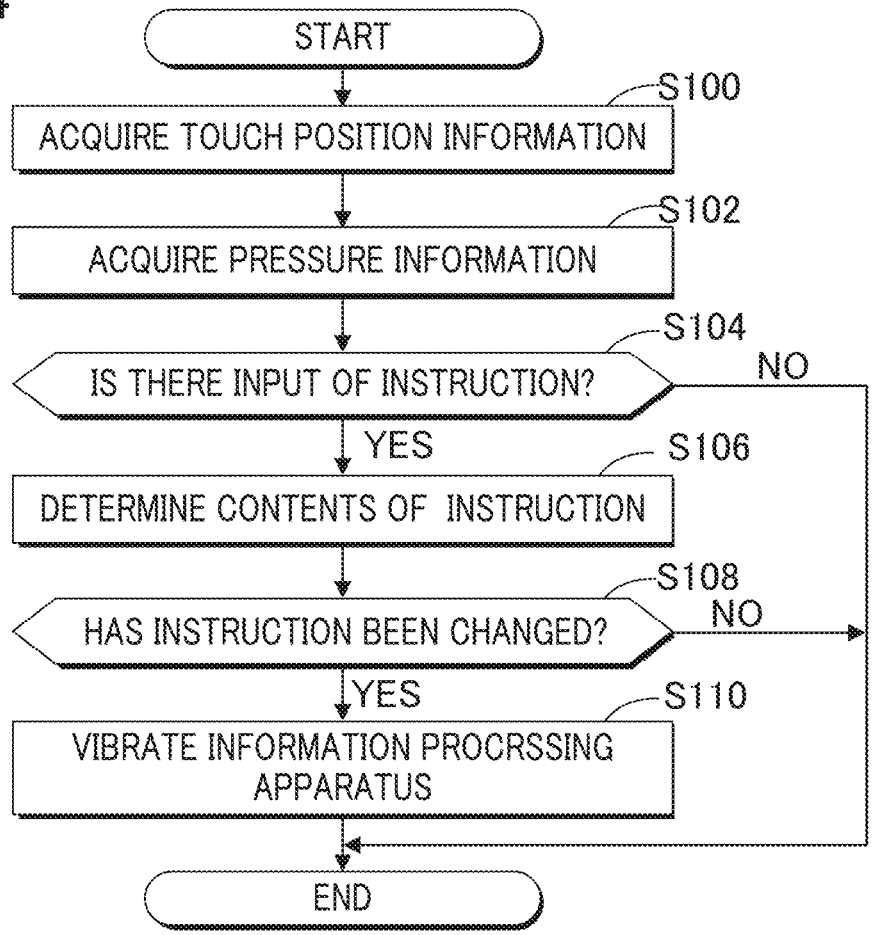
FIG. 4 is a flowchart for explaining an example of an operation of the information processing apparatus 10.

Next, an example of an operation of the information processing apparatus 10 is described with reference to FIG. 4. The operation illustrated in FIG. 4 is started when a predetermined start operation is performed. In the descriptions with reference to FIG. 4, it is assumed that the display controller 143 is displaying a superimposed image on the touch panel 11.

When the touch position information acquirer 144 acquires touch position information (Step S100) and the pressure information acquirer 145 acquires pressure information (Step S102), the input presence determiner 146 determines whether input of a face direction instruction to the touch panel 11 is present, on the basis of the pressure information (Step S104). The order of S100 and S102 may be reversed.

At Step S104, when the pressure indicated by the pressure information is equal to or greater than a first threshold, the input presence determiner 146 determines that input of a face direction instruction is present.

On the other hand, when the pressure indicated by the pressure information is less than the first threshold, the input presence determiner 146 determines that no input of a face direction instruction is present.

Furthermore, in the situation in which the pressure indicated by the pressure information is less than the first threshold, even if a touch to the touch panel 11 is present, the input presence determiner 146 determines that no input of a face direction instruction is present. In other words, "determining that no input of a face direction instruction is present" means "determining that a state of input of an instruction to the touch panel 11 is a neutral state".

When a determination result by the input presence determiner 146 is affirmative (S104: YES), the instruction determiner 147 determines the contents of the face direction instruction on the basis of the touch position information (Step S106).

At Step S106, when the touch position belongs to any one of the upward area R1, the rightward area R2, the downward area R3, and the leftward area R4, the instruction determiner 147 determines that a direction associated with the area to which the touch position belongs is the direction indicated by the face direction instruction.

As an example, when the touch position belongs to the rightward area R2, the instruction determiner 147 determines that the direction indicated by the face direction instruction is the rightward direction. The game controller 141 reflects the direction indicated by the face direction instruction to the progress of the game. For example, when the face direction instruction indicates the rightward direction, the game controller 141 sets the direction of the face B rightward. Furthermore, the instruction determiner 147 stores the current determination result in the storage device 15, and deletes the determination result, which is different from both the current determination result and the previous determination result, from the storage device 15.

Subsequently, when the current contents of the face direction instruction has changed from the previous contents of the face direction instruction (S108: YES), the vibration controller 148 triggers the vibrator 13 to vibrate the entire information processing apparatus 10, including the touch panel 11, for a first predetermined time (for example, 0.1 seconds) (Step S110). The first predetermined time is not limited to 0.1 seconds and can be appropriately changed.

A user can recognize the change of the face direction instruction by perceiving the vibration of the touch panel 11 via the digit. This enables the user to recognize the change of the face direction instruction intuitively. Furthermore, the user can achieve an operational sense close to the sense of operating a physical operation button, in terms of being able to recognize the instruction change through the digit.

On the other hand, when the determination result by the input presence determiner 146 is negative (S104: NO), the instruction determiner 147 does not determine the contents of the face direction instruction, and the vibration controller 148 does not trigger the vibrator 13. Furthermore, when the current contents of the face direction instruction has not changed from the previous contents of the face direction instruction (S108: NO), the vibration controller 148 does not trigger the vibrator 13.

When the determination result by the input presence determiner 146 has changed, the vibration controller 148 may trigger the vibrator 13. In this case, the user can intuitively recognize the change of input of the face direction instruction.

A specific example of an operation to determine whether input of an instruction is present at Step S104 is described with reference to FIG. 5 and FIG. 6.

Figure 5:
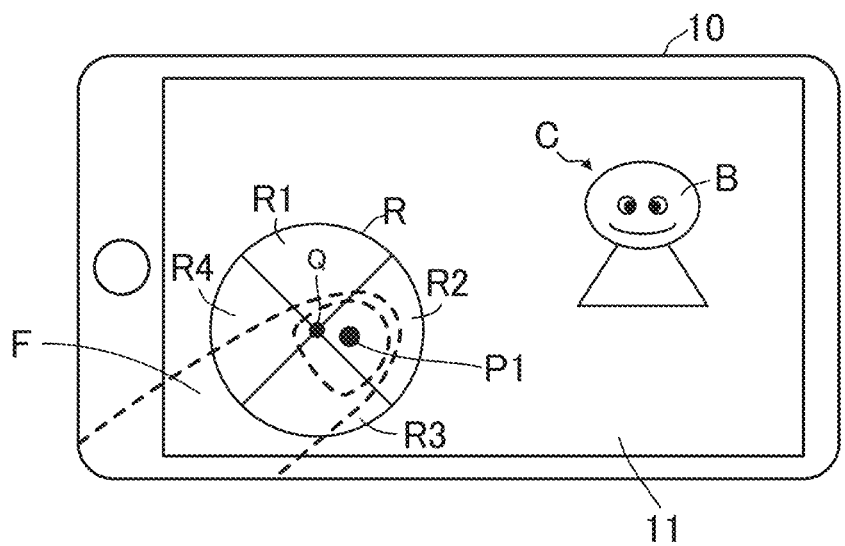
FIG. 5 is a diagram illustrating a state in which a thumb F of a user touches an operation area R with a pressure that is less than a first threshold.

FIG. 5 is a diagram illustrating a state in which a thumb F of a user touches the operation area R with a pressure less than the first threshold.

In the state in which the thumb F of the user touches the operation area R with a pressure less than the first threshold, the input presence determiner 146 determines that the state of input of an instruction to the touch panel 11 is the neutral state. Therefore, the user can realize the neutral state, without releasing the thumb F from the touch panel 11, by setting the pressure applied to the touch panel 11 to be less than the first threshold. This avoids input of an unintended face direction instruction with respect to the touch panel 11, regardless of the touch position on the touch panel 11.

In FIG. 5, as a touch position P1 of the thumb F on the touch panel 11, a position of the center of gravity of a touch area on the touch panel 11 with which the thumb F comes in contact is used. However, the touch position P1 is not limited to the position of the center of gravity of the touch area, and can be appropriately changed. For example, the touch position P1 may be a position in the touch area, different from the position of the center of gravity of the touch area.

Figure 6:
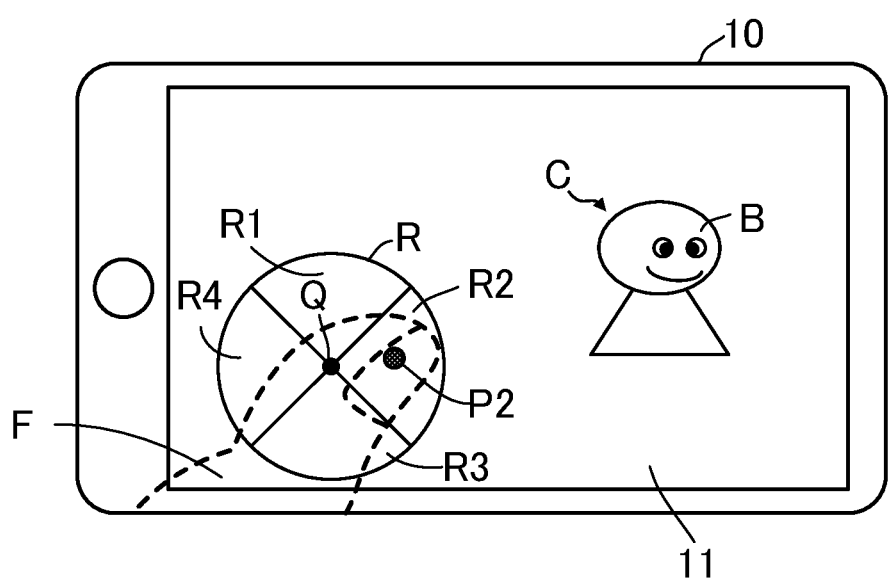
FIG. 6 is a diagram illustrating a state in which the thumb F is tilted.

FIG. 6 is a diagram illustrating a state in which the thumb F is tilted so that the thumb F is located more on the right side than the state illustrated in FIG. 5 on the touch panel 11.

As an example of a state in which the thumb F is tilted as illustrated in FIG. 6, such a state is assumed in which a user tilts the thumb F while pressing the thumb F to the touch panel 11, and thereafter, presses the thumb F on the touch panel 11 in order to maintain the tilt of the thumb F. As illustrated in FIG. 6, in a state in which the user presses the thumb F on the touch panel 11, it is assumed that the pressure applied to the touch panel 11 increases to be more than in the state illustrated in FIG. 5.

When the contact state between the thumb F and the touch panel 11 becomes the state illustrated in FIG. 6 and the pressure applied to the touch panel 11 increases to be equal to or greater than the first threshold, the input presence determiner 146 determines that input of a face direction instruction is present.

When the input presence determiner 146 has determined that input of a face direction instruction is present, the instruction determiner 147 determines the contents of the face direction instruction on the basis of the touch position. In the state illustrated in FIG. 6, a touch position P2 belongs to the rightward area R2. Therefore, the instruction determiner 147 determines that the direction indicated by the face direction instruction is the rightward direction.

When the user intends to return the state of the thumb F from the state illustrated in FIG. 6 to the state illustrated in FIG. 5, it is assumed that the pressure applied to the touch panel 11 from the thumb F in order to tilt the thumb F decreases. When the pressure applied to the touch panel 11 from the thumb F in order to tilt the thumb F decreases to be less than the first threshold, the state becomes the neutral state again.

According to the first embodiment, the input presence determiner 146 determines that input of a face direction instruction is present when the pressure indicated by the pressure information is equal to or greater than the first threshold.

By setting the pressure applied to the touch panel 11 to be less than the first threshold, the user can prevent input of an unintended instruction to the touch panel 11, even if the user is touching the touch panel 11.

Therefore, in a case in which the user does not intend to input an instruction to the touch panel 11, the user does not need to move the touch position to the neutral area on the touch panel 11, thereby enabling reduction in erroneous input based on a difference between the touch position and the neutral area.

Furthermore, the user can realize a state in which an instruction is not input to the touch panel 11, without performing a motion requiring load such as releasing the thumb F from the touch panel 11.

The neutral area is not required. Therefore, movement of a digit such as a slide of the digit in order to move the touch position to the neutral area is not required. Furthermore, the user can realize the neutral state by movement of a digit such as tilting the thumb F, that is, by the movement of a digit that has a smaller displacement than sliding the digit, thereby improving the operability.

In the first embodiment, for example, configurations exemplified below may be employed.

Modification A1

In the first embodiment, the operation area R may be set at a position based on a touch position on the touch panel 11.

A hardware configuration of the information processing apparatus 10 in a modification A1 is substantially the same as that of the information processing apparatus 10 according to the first embodiment illustrated in FIG. 1 and FIG. 2. In other words, the information processing apparatus 10 in the modification A1 includes the touch panel 11, the pressure detector 12, the vibrator 13, the controller 14, and the storage device 15.

Figure 7:
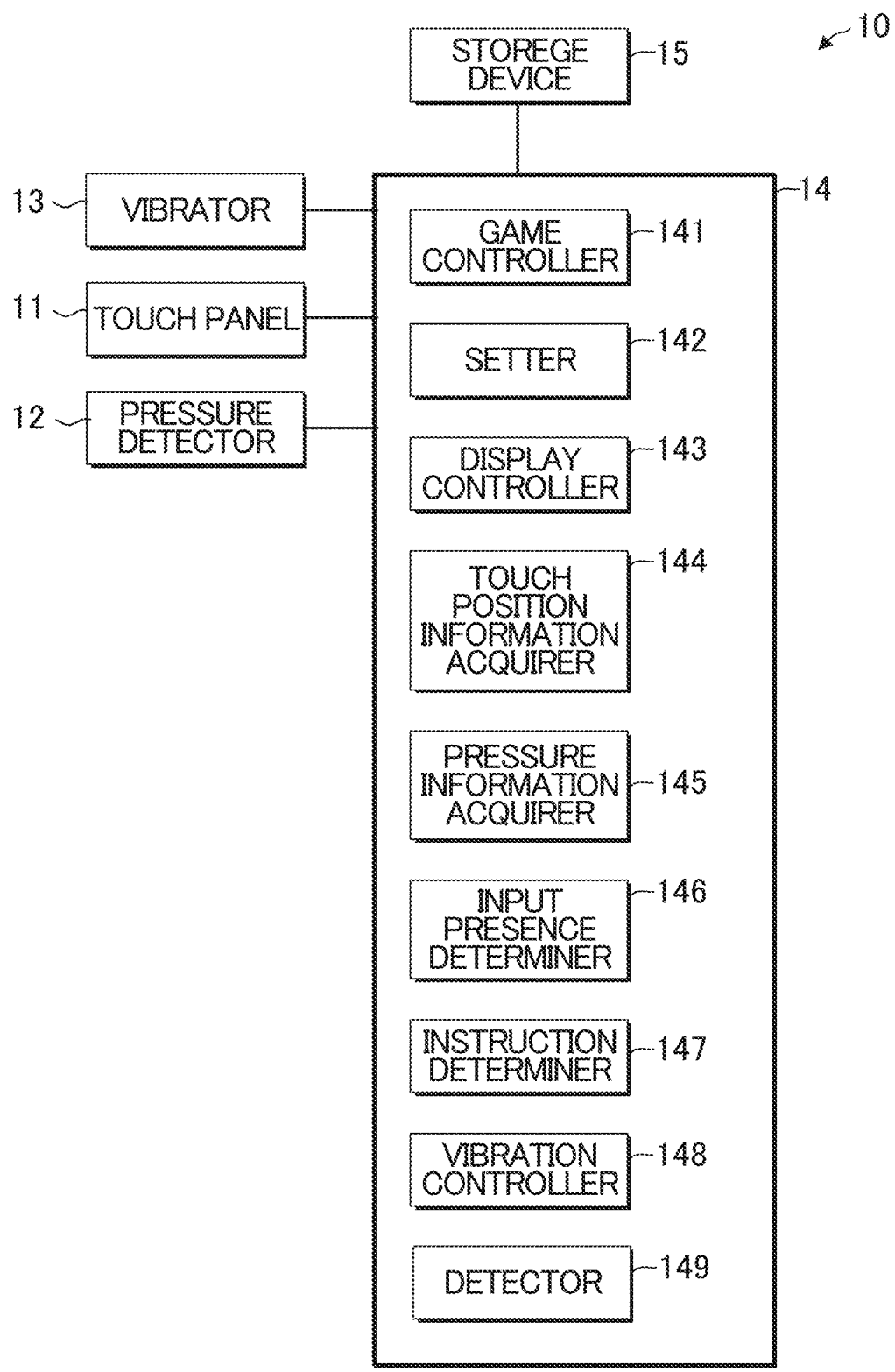
FIG. 7 is a block diagram illustrating a functional configuration of an information processing apparatus 10 according to a modification A1.

FIG. 7 is a block diagram illustrating a functional configuration of the information processing apparatus 10 according to the modification A1. The controller 14 according to the modification A1 executes the program stored in the storage device 15, thereby functioning as the game controller 141, the setter 142, the display controller 143, the touch position information acquirer 144, the pressure information acquirer 145, the input presence determiner 146, the instruction determiner 147, the vibration controller 148, and a detector 149. Also in the modification A1, some or all of the functions of the controller 14 may be realized by dedicated electronic circuitry as in the first embodiment.

The modification A1 is different from the first embodiment in that the modification A1 includes the detector 149 and that the function of the setter 142 is changed. The modification A1 is described below mainly for the points different from the first embodiment.

The detector 149 detects a change in state from a first state in which no touch to the touch panel 11 is present to a second state in which a touch to the touch panel 11 is present (hereinafter, "touch-in") on the basis of the touch position information. For example, when the state is switched from a state in which input of touch position information is present (first state) to a state in which the touch position information indicates the second state, the detector 149 detects the touch-in.

The detector 149 may detect the touch-in on the basis of pressure information. For example, when the pressure indicated by the pressure information is switched from a third state in which the pressure indicated by the pressure information is less than a second threshold to a fourth state in which the pressure indicated by the pressure information is equal to or greater than the second threshold, the detector 149 detects the touch-in. The second threshold is a value less than the first threshold.

Furthermore, the detector 149 may detect a change in state from the second state to the first state (hereinafter, "touch-off") on the basis of the touch position information. For example, when the state is switched from a state in which the touch position information indicates the second state to a state in which no input of the touch position information is present, the detector 149 detects the touch-off.

The detector 149 may detect the touch-off on the basis of the pressure information. For example, when switching a state from the fourth state to the third state occurs, the detector 149 detects the touch-off.

The setter 142 sets the position of the operation area R at a position based on the touch position on the touch panel 11. The setter 142 sets the operation area R so that a specific portion of the operation area R is located, for example, at the touch position. The "specific portion of the operation area R" is, for example, a portion at which the center of gravity of the operation area R is present. The "specific portion of the operation area R" is not limited to the portion at which the center of gravity of the operation area R is present and can be appropriately changed. For example, the "specific portion of the operation area R" may be an end of the operation area R (a right end, a left end, an upper end, or a lower end).

The setter 142 may set the operation area R at a position away from the touch position by a certain distance, or when the touch position moves, may reset the operation area R to a moving destination of the touch position.

"To set the operation area R" may refer to changing a state in which the operation area R is not set to a state in which the operation area R is set, or resetting the operation area R so that the operation area R already being set is moved.

For example, when the detector 149 detects a touch-in, the setter 142 sets the position of the operation area R to a position based on the touch position on the touch panel 11.

When the detector 149 detects a touch-off, the setter 142 may delete the operation area R from the touch panel 11 by releasing setting of the operation area R on the touch panel 11, or may maintain the setting of the operation area R. In the following descriptions, the setter 142 releases the setting of the operation area R on the touch panel 11 when the detector 149 detects the touch-off.

Figure 8:
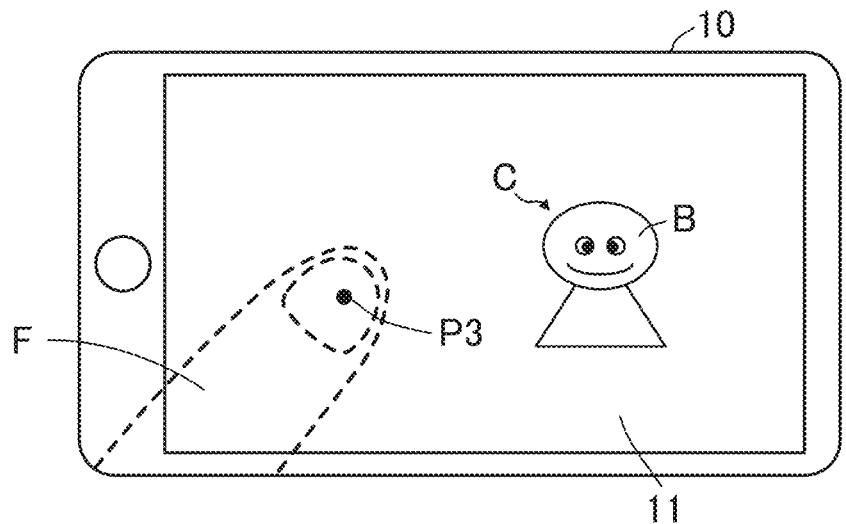
FIG. 8 is a diagram illustrating a state at an instant when a touch-in by the thumb F has occurred.

FIG. 8 is a diagram illustrating a state at an instant when a touch-in by a thumb F has newly occurred, in a state in which the operation area R is deleted from the touch panel 11 in response to the touch-off.

Figure 9:
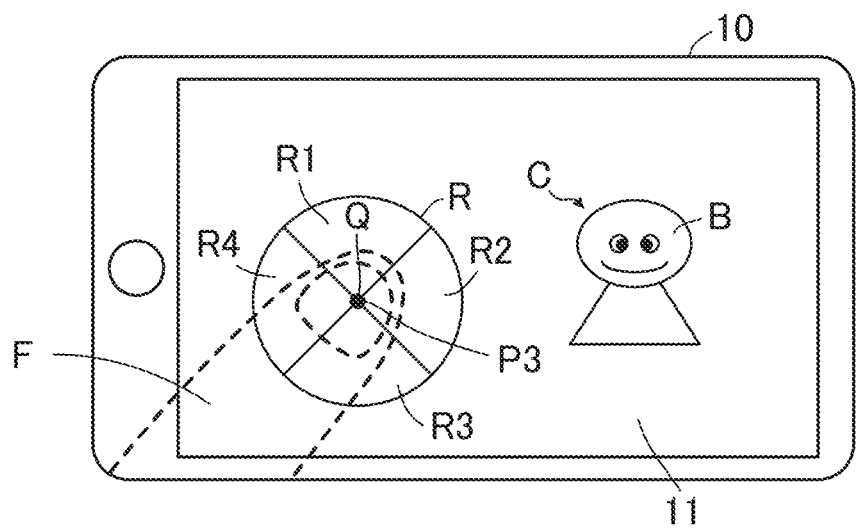
FIG. 9 is a diagram illustrating an example of setting of the operation area R.

When the detector 149 detects the touch-in, the setter 142 sets the operation area R on the touch panel 11, so that the reference point Q of the operation area R is located at a touch position P3, for example, as illustrated in FIG. 9.

According to the modification A1, for example, the operation area R is set based on the touched-in position. This enables matching the positions, for example, of the thumb F and the operation area R with each other, without the user being aware of the position of the operation area R at the time of touch-in. Furthermore, since the position of the operation area R is reset every time a touch-in occurs, the operation area R formerly set becomes substantially invalid at the time of touch-off.

When a touch-in occurs in a state in which the pressure indicated by the pressure information is less than the first threshold, the setter 142 may set the operation area R based on the touched-in position. For example, when a touch-in occurs in the state in which the pressure indicated by the pressure information is less than the first threshold, the setter 142 sets the operation area R so that the reference point Q is located at the touched-in position.

When a touch-in occurs in a state in which the pressure indicated by the pressure information is less than the first threshold, the state is assumed to be a state in which a backside portion of a thumbnail of the pad of the thumb F is not tilted with respect to the touch panel 11 (hereinafter, "reference state"). When the position of the operation area R is set on the touch panel 11 based on the touch position in this state, for example, when the position of the operation area R is set so that the reference point Q is located at the touch position, probability of occurrence of a difference in position between the thumb and the operation area R can be decreased as compared to a case in which the operation area R is fixed.

When a determination result by the input presence determiner 146 is negative, the setter 142 may set the operation area R at a position based on the touch position on the touch panel 11, regardless of the presence of a touch-in.

Figure 10:
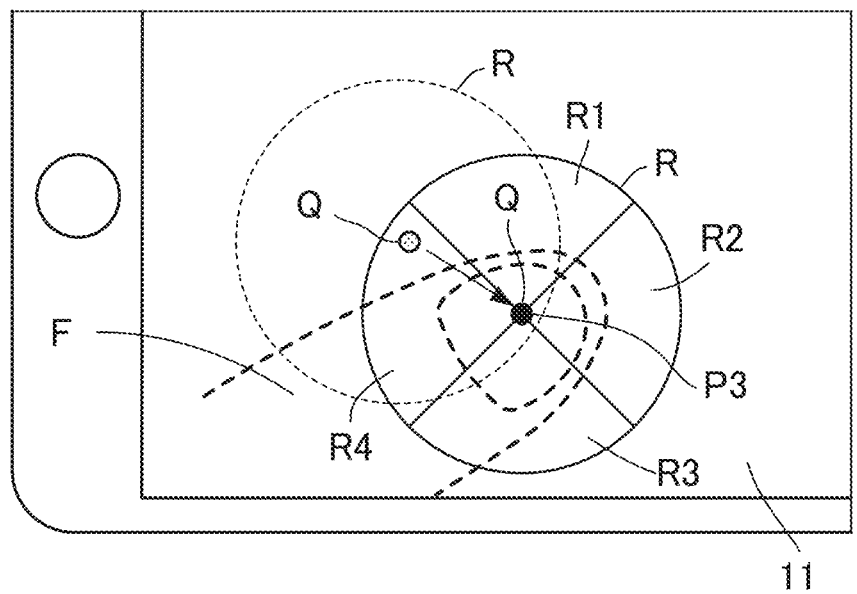
FIG. 10 is a diagram illustrating another example of setting of the operation area R.

As an example, as illustrated in FIG. 10, when the touch position P3 is away from the reference point Q (in FIG. 10, a reference point Q indicated by a dotted circle) in a neutral state, the setter 142 resets the reference point Q to the touch position P3 to shift the operation area R on the basis of the touch position P3. The state illustrated in FIG. 10 occurs when the touch position P3 deviates from the reference point Q in a situation in which touch to the touch panel 11 is continued in the neutral state, for example.

In this manner, when a touch position deviates from the reference point Q in the neutral state, the position of the operation area R can be moved in accordance with the touch position, thereby enabling prevention of erroneous input based on misalignment of the touch position with respect to the operation area R.

The position at which the operation area R is reset is not limited to the position at which the reference point Q becomes the touch position, and can be appropriately changed.

The operation of the setter 142 when the determination result by the input presence determiner 146 is affirmative is not limited.

When the determination result by the input presence determiner 146 is affirmative, for example, the setter 142 may set the operation area R at a position based on the touch position. When the touch position is moved, the setter 142 may reset the operation area R at a moving destination of the touch position. The setter 142 may not reset the operation area R even if the touch position moves. The setter 142 may reset the operation area R on the basis of both the touch position and the pressure applied to the touch panel 11.

Modification A2

In the first embodiment and the modification A1, the setter 142 may set the position of the operation area R on the touch panel 11 on the basis of both the touch position information and the pressure information.

For example, when the determination result by the input presence determiner 146 is affirmative, the setter 142 sets the operation area R on the touch panel 11, on the basis of both the touch position indicated by the touch position information and the pressure information.

As an example, the setter 142 decides the distance between the touch position and the operation area R on the basis of the magnitude of the pressure indicated by the pressure information, and decides the direction of the operation area R as seen from the touch position on the basis of the touch position.

As a more specific example, for example, when the determination result by the input presence determiner 146 is affirmative, the setter 142 may set the operation area R at an end point of a vector. The vector has a direction corresponding to the touch position and a length corresponding to the magnitude of the pressure indicated by the pressure information, and starts from the touch position.

The direction of the vector corresponding to the touch position is a direction opposite to a direction associated with an area to which the touch position belongs, from among the upward area R1, the rightward area R2, the downward area R3, and the leftward area R4. For example, when the touch position belongs to the rightward area R2, the direction of the vector is "leftward". When the touch position belongs to the leftward area R4, the direction of the vector is "rightward". When the touch position belongs to the upward area R1, the direction of the vector is "downward". When the touch position belongs to the downward area R3, the direction of the vector is "upward".

With regard to the length of the vector corresponding to the magnitude of the pressure, for example, as the pressure indicated by the pressure information (touch pressure) becomes greater, the length of the vector becomes longer. As an example, when the pressure indicated by the pressure information is less than the first threshold, the length of the vector is "0". When the pressure indicated by the pressure information is equal to or greater than the first threshold, the length of the vector is set to be longer, as the pressure increases.

Figure 11:
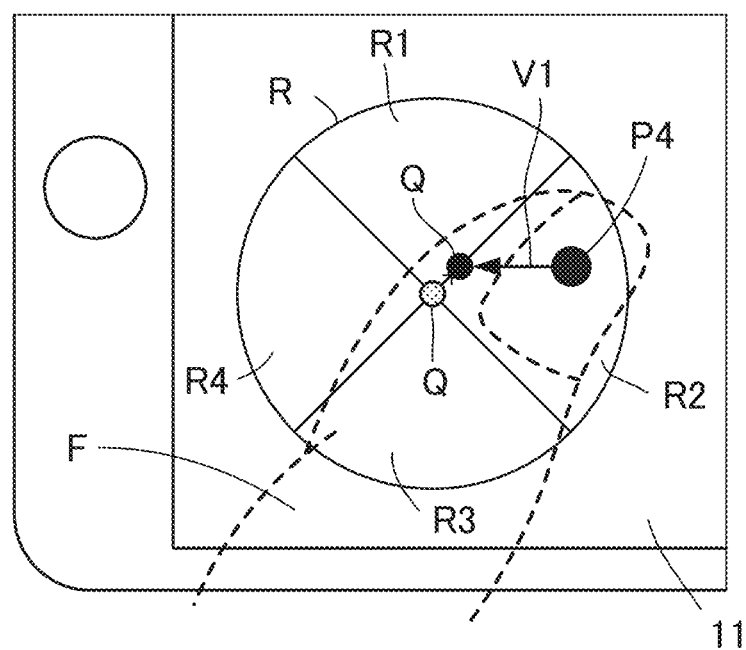
FIG. 11 is a diagram illustrating another example of setting of the operation area R.
Figure 12:
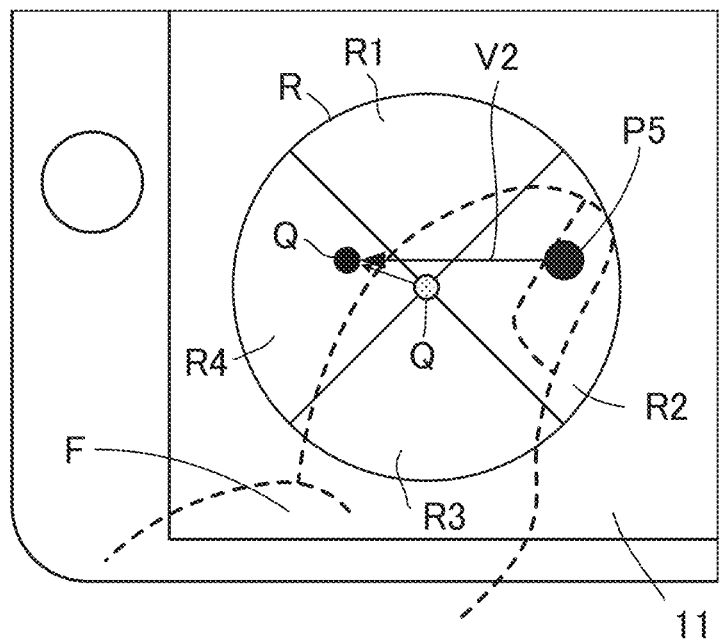
FIG. 12 is a diagram illustrating another example of setting of the operation area R.

FIG. 11 and FIG. 12 are explanatory diagrams of a modification A2. In FIG. 11 and FIG. 12, although the position of the operation area R and the touch position on the touch panel 11 are the same, the pressure applied to the touch panel 11 is different. Specifically, the pressure applied to the touch panel 11 in FIG. 11 is less than that in FIG. 12.

In the modification A2, the setter 142 regards the tilt (rotation) of the thumb F with respect to the thumb F in the reference state to increase as the pressure applied to the touch panel 11 increases. Therefore, the setter 142 sets the length of a vector V1 illustrated in FIG. 11 to be shorter than the length of a vector V2 illustrated in FIG. 12. Here, the vector V1 starts from a touch position P4, which belongs to the rightward area R2, and has a leftward direction. The vector V2 starts from a touch position P5, which belongs to the rightward area R2, and has a leftward direction.

The operation of the setter 142 in the modification A2 when a touch occurs that causes the determination result by the input presence determiner 146 to be negative (hereinafter, "weak touch"), is not limited.

For example, when a weak touch occurs, the setter 142 in the modification A2 may set the reference point Q at a position based on the touch position. When the touch position moves, the setter 142 may reset the reference point Q at a moving destination of the touch position.

The setter 142 may not reset the position of the operation area R even if the touch position moves. The setter 142 may reset the position of the operation area R on the basis of both the touch position and the pressure, as in the case in which the determination result by the input presence determiner 146 is affirmative.

Furthermore, the setter 142 in the modification A2 may reset the position of the operation area R on the basis of both the touch position and the pressure, regardless of the determination result by the input presence determiner 146.

According to the modification A2, the distance between the operation area R and the touch position is adjusted in accordance with the pressure applied to the touch panel 11. Therefore, a difference between the position of the operation area R recognized by a user and the actual position of the operation area R can be decreased, as compared to a configuration in which the distance between the operation area R and the touch position is not adjusted in accordance with the pressure applied to the touch panel 11.

Modification A3

In the first embodiment, the modification A1, and the modification A2, the upward area R1, the rightward area R2, the downward area R3, and the leftward area R4 may be omitted, and the instruction determiner 147 may determine the direction from the reference point Q toward the touch position as the direction indicated by a face direction instruction.

According to a modification A3, four or more directions can be input. Therefore, operation flexibility is improved as compared to the configuration having the upward area R1, the rightward area R2, the downward area R3, and the leftward area R4.

Modification A4

In the first embodiment and the modifications A1 to A3, the operation area R may be omitted and the instruction determiner 147 may determine the direction indicated by a face direction instruction on the basis of a change of the touch position.

The "change of the touch position" may be a change of the touch position within a period including a time point when the input presence determiner 146 has determined that input is present. The "change of the touch position" may be a change of the touch position within a period not including the time point when the input presence determiner 146 has determined that input is present (for example, a period started within a second predetermined time (for example, 0.1 second) from the time point when determining that input is present). The second predetermined time is not limited to 0.1 seconds, and can be appropriately changed.

The "period including a time point when the input presence determiner 146 has determined that input is present" may be a period ending at the time point when the input presence determiner 146 has determined that input is present, for example. The "period including a time point when the input presence determiner 146 has determined that input is present" may be a period starting from the time point when the input presence determiner 146 has determined that input is present. The "period including a time point when the input presence determiner 146 has determined that input is present" may be a period started before the time point when the input presence determiner 146 has determined that input is present and ending after the time point when the input presence determiner 146 has determined that input is present.

The instruction determiner 147 may determine the change direction of the touch position within the period including the time point when the input presence determiner 146 has determined that input is present, as the direction indicated by a face direction instruction. The instruction determiner 147 may determine the direction obtained by rotating the change direction of the touch position within the period including the time point when the input presence determiner 146 has determined that input is present by a predetermined angle, as the direction indicated by a face direction instruction.

In the following descriptions, it is assumed that the instruction determiner 147 determines the direction indicated by a face direction instruction, on the basis of the direction of a change of the touch position within a period including the time point when the input presence determiner 146 has determined that input of a face direction instruction is present.

The time point when the input presence determiner 146 has determined that input of a face direction instruction is present can be considered to be a time point when input of a face direction instruction is performed. Therefore, the direction indicated by the face direction instruction is determined in accordance with the touch position information at that point in time.

For example, a motion of tilting a thumb F (hereinafter, "tilting motion") so that the thumb F changes the state from the state illustrated in FIG. 5 to the state illustrated in FIG. 6 is assumed.

Figure 13:
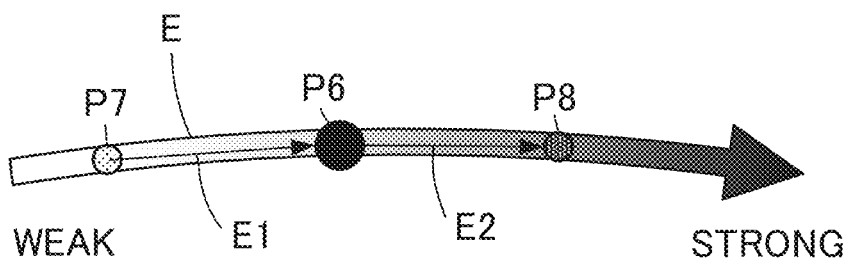
FIG. 13 is a diagram illustrating an example of movement of a touch position and a transition of a pressure applied to a touch panel 11.

FIG. 13 is a diagram illustrating an example of movement of a touch position and a transition of a pressure applied to the touch panel 11 during a period in which a tilting motion is performed. In FIG. 13, the position of each portion forming an arrow E represents movement of a touch position, and the density of the arrow E at the position of each portion forming the arrow E represents a magnitude of a pressure of each position.

In the example illustrated in FIG. 13, the touch position moves from left to right, with increase of the tilt of the thumb F. Furthermore, the pressure applied to the touch panel 11 increases, with an increase of the tilt of the thumb F.

At a point in time when the pressure applied to the touch panel 11 becomes equal to or greater than the first threshold, the instruction determiner 147 determines the direction in which the touch position has moved until the time (a direction indicated by an arrow E1 in FIG. 13) as the direction indicated by a face direction instruction on the basis of the touch position information.

In the following descriptions, a process of determining the direction in which the touch position has moved until the pressure applied to the touch panel 11 becomes equal to or greater than the first threshold, as the direction indicated by a face direction instruction, is referred to as "first direction determination process".

When the pressure applied to the touch panel 11 becomes equal to or greater than the first threshold, the instruction determiner 147 may determine the direction of movement of the touch position thereinafter (a direction indicated by an arrow E2 in FIG. 13), as the direction indicated by the face direction instruction, on the basis of the touch position information.

In the following descriptions, a process of determining the direction of movement of the touch position after the pressure applied to the touch panel 11 becomes equal to or greater than the first threshold, as the direction indicated by a face direction instruction, is referred to as "second direction determination process".

In the first direction determination process, the instruction determiner 147 determines, for example, the direction of a first vector as the direction indicated by a face direction instruction. The first vector ends at a touch position P6 at a first time point when the pressure applied to the touch panel 11 becomes equal to or greater than the first threshold. The first vector starts from a touch position P7 at a second time point before the first time point by a first time (for example, 50 milliseconds). The first time is not limited to 50 milliseconds, and can be appropriately changed.

In the first direction determination process, the instruction determiner 147 can start determination of the direction indicated by a face direction instruction at the first time point. At the time of performing the first direction determination process, the instruction determiner 147 needs to store in the storage device 15 the touch position information of from at least first time before the present time, for example.

In the second direction determination process, the instruction determiner 147 determines the direction of a second vector, for example, as the direction indicated by a face direction instruction. The second vector starts from the touch position P6 at the first time point and ends at a touch position P8 at a third time point after the first time point just by a second time (for example, 50 milliseconds). The second time is not limited to 50 milliseconds and can be appropriately changed. The second time may be the same as the first time or may be different therefrom.

In the second direction determination process, it is not required to store the touch position information of from at least a first time before the present time point in the storage device 15, as in the first direction determination process. When the second direction determination process is to be performed, determination of the direction indicated by a face direction instruction is started at the third time point. Therefore, delay in the determination occurs as compared to the first direction determination process in which the determination is started at the first time point.

The instruction determiner 147 may determine the direction of a combined vector combining the first vector and the second vector (for example, a vector starting from the touch position P7 and ending at the touch position P8) as the direction indicated by a face direction instruction.

The instruction determiner 147 may use, as a start point of the first vector, a touch position, which has a first distance (for example, 3 millimeters) from the touch position P6, among touch positions generated temporally before the touch position P6, instead of the touch position P7 at the second time point. The first distance is not limited to 3 millimeters, and can be appropriately changed.

The instruction determiner 147 may use, as an end point of the second vector, a touch position, which has a second distance (for example, 3 millimeters) from the touch position P6, among touch positions generated temporally after the touch position P6, instead of the touch position P8 at the third time point. The second distance is not limited to 3 millimeters, and can be appropriately changed. The second distance may be the same as the first distance, or may be different therefrom.

Figure 14:
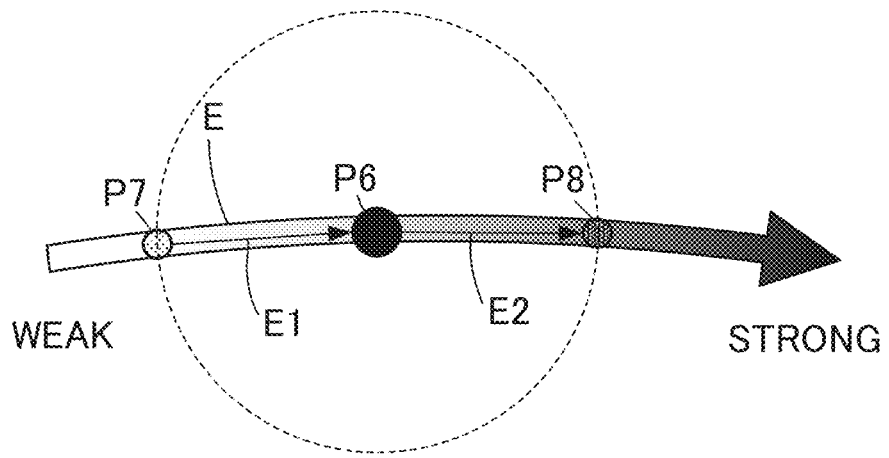
FIG. 14 is a diagram illustrating an example of touch positions P6 to P8.

FIG. 14 is a diagram illustrating an example of the touch positions P6 to P8, in a case in which the first distance and the second distance are each set to 3 millimeters.

According to a modification A4, the instruction determiner 147 determines the direction indicated by a face direction instruction on the basis of a change of the touch position in a period including a time point at which the pressure applied to the touch panel 11 becomes the first threshold. This allows a user to input a face direction instruction on the touch panel 11 without being aware of the operation area R. Furthermore, the operation area R can be omitted. Therefore, a game image can be easily viewed on the touch panel 11.

In the modification A4, when a user inputs a plurality of face direction instructions on the touch panel 11, a neutral state is generated every time a face direction instruction is input on the touch panel 11.

Modification A5

In the first embodiment and the modifications A1 to A4, the setter 142 may set a face direction instruction input area for inputting a face direction instruction (an area in which an operation area R is set) and an offensive-defensive motion input area for inputting an instruction of an attack or defense motion of a character C (hereinafter, "offensive or defensive motion instruction") on the touch panel 11.

The offensive or defensive motion instruction is an example of a first instruction regarding a game. As an example of the offensive or defensive motion instruction, an attack instruction to cause the character C to swing a sword (not shown), and a guard instruction to cause the character C to take a guard (defensive) posture can be cited.

The offensive-defensive motion input area is an example of a first area for inputting the first instruction regarding the game. The face direction instruction is an example of a second instruction regarding the game in a modification A5. The face direction instruction input area is an example of a second area for inputting the second instruction regarding the game.

Figure 15:
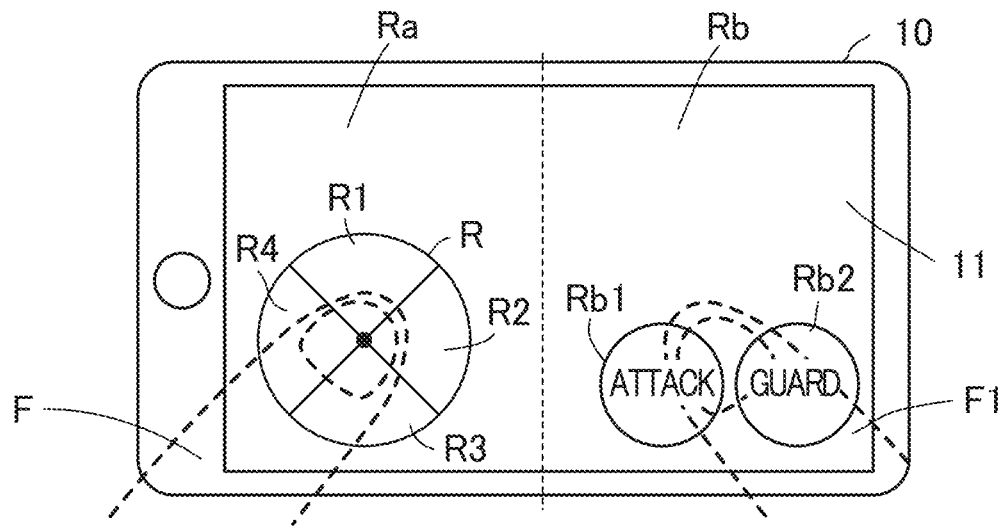
FIG. 15 is a diagram illustrating an example of the information processing apparatus 10 including the touch panel 11 in which a face-direction-instruction-input area Ra and an offensive/defensive-motion-input area Rb are set.

FIG. 15 is a diagram illustrating an example of the information processing apparatus 10 including the touch panel 11 in which a face direction instruction input area Ra and an offensive-defensive motion input area Rb are set.

An operation area R is set in the face direction instruction input area Ra. An attack button Rb1 and a guard button Rb2 are set in the offensive-defensive motion input area Rb. The attack button Rb1 is used to input an attack instruction to the touch panel 11. The guard button Rb2 is used to input a guard instruction to the touch panel 11.

The attack button Rb1 and the guard button Rb2 may not be set in the offensive-defensive motion input area Rb. In this case, for example, a tap to the offensive-defensive motion input area Rb may be used as the attack instruction, and a touch to the offensive-defensive motion input area Rb, which continues for more than a third time (for example, 1 second), may be used as the guard instruction. The third time is not limited to 1 second, and can be appropriately changed.

As described above, the pressure detector 12 detects a pressure applied to the touch panel 11.

When there are taps simultaneously to the face direction instruction input area Ra and the offensive-defensive motion input area Rb (hereinafter, "multi-taps"), it is not clear in which area of the face direction instruction input area Ra and the offensive-defensive motion input area Rb the pressure detected by the pressure detector 12 is generated.

Therefore, when the pressure applied to the touch panel 11 becomes equal to or greater than the first threshold in a state in which multi-taps occur, an error is likely to occur in the determination of whether input of a face direction instruction is present.

To reduce error, such a mode may be adopted in which the game is not affected by a touch to the face direction instruction input area Ra when a touch to the offensive-defensive motion input area Rb is present.

For example, when a touch to the offensive-defensive motion input area Rb is present, the input presence determiner 146 and the instruction determiner 147 may each stop determination or prevent output of a determination result in a situation in which the touch is continued.

As another example, when a touch to the offensive-defensive motion input area Rb is present, even if the input presence determiner 146 and the instruction determiner 147 perform determination, the game controller 141 may abandon these determination results so as not to reflect the determination results to the game in a situation in which the touch is continued.

According to the modification A5, erroneous determination of a face direction instruction due to input of an offensive or defensive motion instruction can be reduced.

In the modification A5, for example, in response to the end of the touch to the offensive-defensive motion input area Rb, determination of whether input of a face direction instruction is present is resumed. In response to the end of the touch to the offensive-defensive motion input area Rb, determination of the direction indicated by a face direction instruction in the case in which input of a face direction instruction is present is resumed.

In response to the end of the touch to the offensive-defensive motion input area Rb, it is stopped that the game controller 141 abandons the determination results by the input presence determiner 146 and the instruction determiner 147.

In the modification A5, the direction of the face B cannot be changed simultaneously with the offensive and defensive motion. However, for example, when the offensive or defensive motion instruction is an instruction to be completed within a short time (for example, 0.1 second) such as a tap, the time while the direction of the face B cannot be changed is a short period. Therefore, an effect of enabling reduction of erroneous determination of a face direction instruction exceeds the inconvenience such that the direction of the face B cannot be changed simultaneously with the offensive and defensive motion.

To reduce the inconvenience described above, only for a specific time (for example, 1 second) since start of a touch to the offensive-defensive motion input area Rb, the input presence determiner 146 and the instruction determiner 147 may each stop determination or prevent the change of a determination result, or even if the input presence determiner 146 and the instruction determiner 147 perform determination, the game controller 141 may abandon these determination results.

Figure 16:
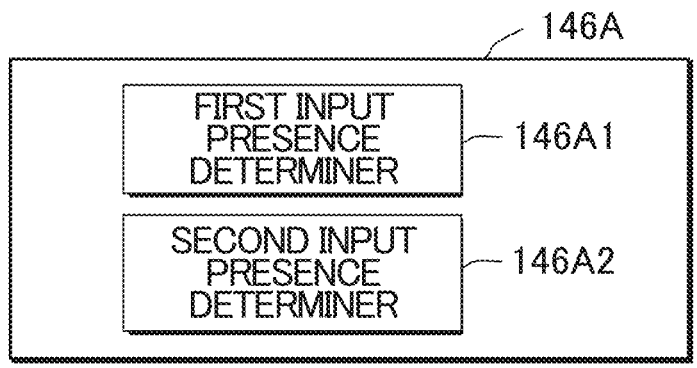
FIG. 16 is a diagram illustrating an input presence determiner 146A.

For example, the modification A5 may be realized by using an input presence determiner 146A illustrated in FIG. 16 as the input presence determiner 146 in the first embodiment, the modification A1, the modification A2, the modification A3, and the modification A4.

In FIG. 16, the input presence determiner 146A includes a first input presence determiner 146A1 and a second input presence determiner 146A2.

The first input presence determiner 146A1 determines whether input of an offensive or defensive motion instruction is present, on the basis of the touch position information. The first input presence determiner 146A1 is an example of a first determiner.

For example, when the touch position indicated by the touch position information is located on either the attack button Rb1 or the guard button Rb2, the first input presence determiner 146A1 determines that input of an offensive or defensive motion instruction is present.

On the other hand, when the touch position indicated by the touch position information is not located on either the attack button Rb1 or the guard button Rb2, the first input presence determiner 146A1 determines that no input of an offensive or defensive motion instruction is present.

In a state in which the touch position information indicates at least that a touch with respect to the face direction instruction input area Ra is present, when a determination result by the first input presence determiner 146A1 based on the touch position information (hereinafter, "first touch position information") is negative, the second input presence determiner 146A2 operates as described below.

That is, the second input presence determiner 146A2 determines whether input of a face direction instruction is present, on the basis of the pressure information (hereinafter, "first pressure information") acquired by the pressure information acquirer 145 at a time when the touch position information acquirer 144 acquires the first touch position information (the touch position information indicating at least that a touch with respect to the face direction instruction input area Ra is present).

For example, when the pressure indicated by the first pressure information is equal to or greater than the first threshold, the second input presence determiner 146A2 determines that input of a face direction instruction is present. The second input presence determiner 146A2 is an example of a second determiner.

When the second input presence determiner 146A2 has determined that input of a face direction instruction is present, the instruction determiner 147 determines the direction indicated by the face direction instruction, by using the first touch position information (the touch position information indicating at least that a touch with respect to the face direction instruction input area Ra is present) as the touch position information.

When a determination result by the first input presence determiner 146A1 based on the first touch position information is affirmative, that is, when multiple touches are occurring, the instruction determiner 147 maintains the determination result so that the determination result of the direction indicated by the face direction instruction does not change. Therefore, the game executed by the game controller 141 is not affected by the determination result by the instruction determiner 147, during a period in which the determination result by the first input presence determiner 146A1 based on the first touch position information is affirmative, that is, during a period in which multiple touches are occurring.

When the determination result by the first input presence determiner 146A1 based on the first touch position information is affirmative, that is, when multiple touches are occurring, the instruction determiner 147 may stop determination of the direction indicated by the face direction instruction, or it may not output a determination result even after performing the determination, or the game controller 141 may abandon the determination result by the instruction determiner 147.

On the other hand, when the pressure indicated by the first pressure information is less than the first threshold, the second input presence determiner 146A2 determines that no input of a face direction instruction is present.

When the determination result by the first input presence determiner 146A1 based on the first touch position information is affirmative, that is, when multiple touches are occurring, the second input presence determiner 146A2 maintains the determination result, for example, so that the determination result of whether input of a face direction instruction is present does not change. Therefore, the game executed by the game controller 141 is not progressed in accordance with a change of the determination result by the second input presence determiner 146A2, during a period in which the determination result by the first input presence determiner 146A1 based on the first touch position information is affirmative, that is, during a period in which multiple touches are occurring.

Modification A6

In the modification A5, such a case is assumed in which input of an offensive or defensive motion instruction is completed within a short time by input such as by a tap.

However, it is assumed that, for example, input of a guard instruction that is input of offensive or defensive motion instructions, is performed continuously while a user waits and sees how a character of an opponent works, that is, for a relatively long time.

Therefore, in a modification A6, when input of the offensive or defensive motion instruction continues for more than a fourth time (for example, 1 second) in the modification A5, the second input presence determiner 146A2 adjusts the first threshold on the basis of the pressure applied to the touch panel 11 when the input of the offensive or defensive motion instruction continues for the fourth time. The fourth time is not limited to 1 second, and can be appropriately changed.

After the first threshold has been adjusted, when the following state (state 1) occurs, the second input presence determiner 146A2 determines that input of a face direction instruction is present.

State 1: a case in which the pressure applied to the touch panel 11 becomes equal to or greater than the first threshold after being adjusted, in a state in which the touch position information acquired by the touch position information acquirer 144 is the first touch position information (touch position information indicating at least that a touch with respect to the face direction instruction input area Ra is present).

When any one of the following two states (state 2 and state 3) occurs, the second input presence determiner 146A2 may determine that input of a face direction instruction is present.

State 2: a case in which a new touch to the face direction instruction input area Ra is present.

State 3: a case in which a touch position in the face direction instruction input area Ra has moved by a predetermined distance or more.

According to the modification A6, even if input of an offensive or defensive motion instruction continues for more than the fourth time, input of a face direction instruction can be received.

When the input of the offensive or defensive motion instruction ends, the second input presence determiner 146A2 returns the first threshold after adjustment to the first threshold before adjustment.

A function added to the second input presence determiner 146A2 in the modification A6 is described here.

The second input presence determiner 146A2 determines whether input of a face direction instruction is present, on the basis of both the first pressure information and a determination result by the first input presence determiner 146A1 based on the first touch position information (touch position information indicating at least that a touch with respect to the face direction instruction input area Ra is present).

For example, when the duration of the input of an offensive or defensive motion instruction is less than that of the fourth time, the second input presence determiner 146A2 performs the operation in the modification A5.

When the duration of the input of the offensive or defensive motion instruction reaches the fourth time, the second input presence determiner 146A2 adjusts the first threshold on the basis of the pressure information at a time point when the input of the offensive or defensive motion instruction has continued for the fourth time. Then, in the state in which the touch position information acquired by the touch position information acquirer 144 is the first touch position information (touch position information indicating at least that a touch with respect to the face direction instruction input area Ra is present), the second input presence determiner 146A2 determines whether input of a face direction instruction is present, on the basis of a magnitude relationship between the first threshold after adjustment and the pressure indicated by the pressure information acquired thereinafter.

Here, the first threshold after adjustment is greater than the first threshold before adjustment. For example, the first threshold after adjustment is greater than the first threshold before adjustment by the magnitude of the pressure indicated by the pressure information when the determination result by the first input presence determiner 146A1 is affirmative. The difference between the first threshold after adjustment and the first threshold before adjustment is not limited to the magnitude of the pressure indicated by the pressure information when the determination result by the first input presence determiner 146A1 is affirmative, and can be appropriately changed. For example, the difference between the first threshold after adjustment and the first threshold before adjustment may be an average value of the pressure indicated by the pressure information in a period of the fourth time.

For example, in a state in which the duration of the input of the offensive or defensive motion instruction is equal to or greater than that of the fourth time, and in the state in which the determination result by the first input presence determiner 146A1 based on the first touch position information (touch position information indicating at least that a touch with respect to the face direction instruction input area Ra is present) is affirmative (hereinafter, "first state"), the second input presence determiner 146A2 operates as described below.

That is, the second input presence determiner 146A2 determines that input of a face direction instruction is present (hereinafter, "first determination") when the pressure indicated by the pressure information acquired after adjustment of the first threshold is equal to or greater than the first threshold after adjustment (a first reference value). On the other hand, when the pressure indicated by the pressure information acquired after adjustment of the first threshold is less than the first threshold after adjustment, the second input presence determiner 146A2 determines that no input of a face direction instruction is present.

When input of an offensive or defensive motion instruction is present, the second input presence determiner 146A2 may perform the first determination, even if the duration of the input of the offensive or defensive motion instruction is less than the fourth time.

In this case, even if input of the offensive or defensive motion instruction is present, input of a face direction instruction can be received.

In the modification A6 also, when it is determined that input of a face direction instruction to the touch panel 11 is present, the instruction determiner 147 determines the direction indicated by the face direction instruction, by using the first touch position information (touch position information indicating at least that a touch with respect to the face direction instruction input area Ra is present) as the touch position information.

In the modification A5 and the modification A6, the game progressed by the game controller 141 is not affected by the face direction instruction, in other words, by the touch with respect to the face direction instruction input area Ra, during a period in which it is determined that input of an offensive or defensive motion instruction is present based on the first touch position information, that is, during a period in which multiple touches are occurring. This makes it less likely for the game to be affected by erroneous input of a face direction instruction.

Modification A7

In the first embodiment and the modifications A1 to A6, the input presence determiner 146 may determine whether input of a face direction instruction is present, on the basis of the speed of a change in the pressure indicated by the pressure information. For example, when the speed of a change in the pressure indicated by the pressure information is equal to or greater than a first speed reference value, the input presence determiner 146 determines that input of a face direction instruction is present.

Figure 17:
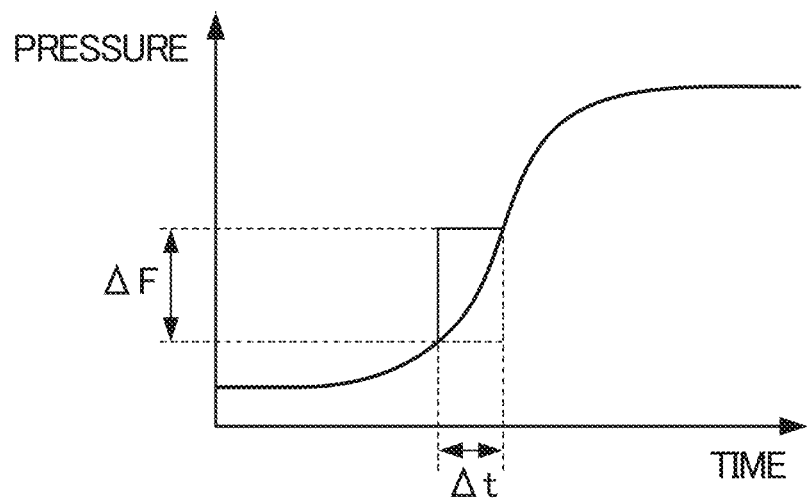
FIG. 17 is a diagram illustrating an example of a change in the pressure to the touch panel 11.

As illustrated in FIG. 17, a state in which the speed of a change in pressure with respect to the touch panel 11 ($\Delta F/\Delta t$) becomes greater than a certain value is assumed to be a state in which a user is inputting some kind of instruction to the touch panel 11. Therefore, it can be determined whether input of a face direction instruction is present, on the basis of the speed of a change in the pressure indicated by the pressure information.

According to the configuration in which it is determined whether input of a face direction instruction is present on the basis of the speed of a change in the pressure indicated by the pressure information, erroneous determination due to individual differences in magnitude of the pressure applied to the touch panel 11 at the time of a touch to the touch panel 11 can be reduced, as compared to a configuration in which it is determined whether input of a face direction instruction is present, on the basis of the magnitude of the pressure indicated by the pressure information.

When a rise rate of the speed of a change in the pressure indicated by the pressure information is equal to or greater than a second speed reference value, the input presence determiner 146 may determine that input of a face direction instruction is present.

For example, the "first speed reference value" and the "second speed reference value" may each be a specific value, a value changed by a user, or a value to be changed in accordance with a touch operation to the touch panel 11.

Modification A8

In the first embodiment, the modifications A1 to A3, and the modifications A5 to A7, when the operation area R is set, a coordinate system defining directions of up and down, and right and left (hereinafter, "screen coordinate system"), and a coordinate system fixed in the operation area R (hereinafter, "operation coordinate system") may be set on the touch panel 11.

The screen coordinate system is a coordinate system indicated by an X-axis and a Y-axis illustrated in FIG. 1.

Figure 18:
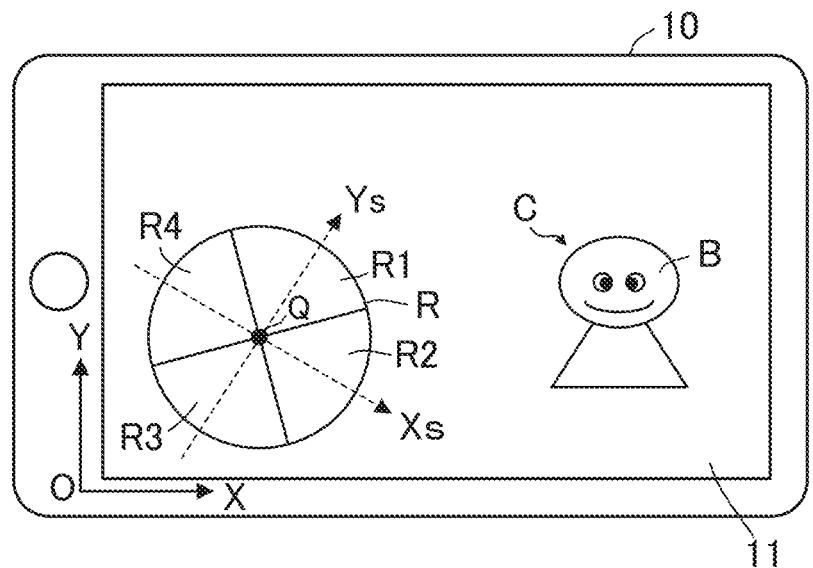
FIG. 18 is a diagram illustrating an example of a screen coordinate system and an operation coordinate system.

The operation coordinate system is a coordinate system having an origin at the reference point Q in the operation area R and having an Xs-axis and a Ys-axis orthogonal to each other as illustrated in FIG. 18.

In the first embodiment and the like, the up and down and right and left directions of the operation area R match the up and down and right and left directions of the screen coordinate system. However, as illustrated in FIG. 18, the up and down and right and left directions of the operation area R may be tilted with respect to the up and down and right and left directions of the screen coordinate system.

The Xs-axis and the Ys-axis are axis lines parallel to the touch panel 11. The Xs-axis corresponds to the right and left direction of the operation area R, and the Ys-axis corresponds to the up and down direction of the operation area R. In other words, the Xs-axis corresponds to the lateral direction of the operation area R, and the Ys-axis corresponds to the longitudinal direction of the operation area R.

In this case, the direction indicated by a face direction instruction is a direction defined by the screen coordinate system (X-axis and Y-axis). The mutual positional relationship among the reference point Q in the operation area R, the upward area R1, the rightward area R2, the downward area R3, and the leftward area R4 is specified by a direction indicated by the operation coordinate system (Xs-axis and Ys-axis). Furthermore, the direction of a vector corresponding to the touch position in the modification A2 becomes the direction defined by the operation coordinate system.

As described above, in the example illustrated in FIG. 1, the direction of the X-axis in the screen coordinate system matches the direction of the Xs-axis of the operation coordinate system, and the direction of the Y-axis in the screen coordinate system matches the direction of the Ys-axis of the operation coordinate system.

Meanwhile, as an example in which directions of respective coordinate axes (X-axis and Y-axis) in the screen coordinate system do not match the directions of respective coordinate axes (Xs-axis and Ys-axis) in the operation coordinate system, there is a configuration in which the operation coordinate system is preset so that a lengthwise direction of a thumb F in the reference state of a user illustrated in FIG. 5 matches the Ys-axis of the operation coordinate system.

Modification A9

In the first embodiment, the modifications A1 to A3, and the modifications A5 to A8, the vibration controller 148 may vibrate the vibrator 13 only for the first predetermined time, when the touch position passes a boundary of the operation area R, for example, in one or both of the states in which the touch position deviates from the operation area R, and in which the touch position deviating from the operation area R has returned to the operation area R.

According to modification A9, a user can intuitively recognize that the touch position has passed the boundary of the operation area R by the vibration of the touch panel 11.

Modification A10

In the first embodiment and the modifications A1 to A9, the touch panel 11 may also output touch information regarding the shape of a touch area on the touch panel 11 with which an object comes in contact, and the touch position information acquirer 144 may also acquire the touch information output from the touch panel 11.

In this case, the input presence determiner 146 determines whether input of a face direction instruction is present, on the basis of both the pressure information and the touch information. For example, when the pressure indicated by the pressure information is equal to or greater than the first threshold, and the shape of the touch area indicated by the touch information has a predetermined feature, the input presence determiner 146 determines that input of a face direction instruction is present.

The predetermined feature is, for example, an aspect ratio (length/width) of a specific range. In a modification A10, the length of a long axis of an ellipse, in a case in which the touch area is approximated by the ellipse, is regarded as a longitudinal length of the touch area, and the length of a short axis of the ellipse is regarded as a lateral length of the touch area.

According to the modification A10, it is determined whether input of a face direction instruction is present, on the basis of both the pressure applied to the touch panel 11 and the shape of the touch area. Therefore, the accuracy of the determination can be improved, as compared to a configuration in which it is determined whether input of a face direction instruction is present on the basis of only the pressure applied to the touch panel 11.

As an example, even if the information processing apparatus 10 is dropped on the floor by mistake, to applying a pressure greater than the first threshold to the touch panel 11, when the shape of the touch area does not have the predetermined feature, erroneous determination of input of a face direction instruction can be prevented.

The predetermined feature is not limited to the aspect ratio (length/width) of the specific range, and can be appropriately changed. For example, the predetermined feature may be a boundary length of the specific range, or an area of the specific range.

Modification A11

In the first embodiment and the modifications A1 to A10, the display controller 143 may display information regarding a determination result by the instruction determiner 147 on the touch panel 11.

For example, the display controller 143 may display information indicating a determination result such as a character or a sign (for example, an arrow) indicating the direction indicated by the determination result from the instruction determiner 147 on the touch panel 11.

Furthermore, the display controller 143 may display a portion of an area corresponding to the direction indicated by the determination result from the instruction determiner 147 (hereinafter, "predetermined portion") in a predetermined display mode on the touch panel 11. The predetermined display mode is a concept including some or all of, for example, displaying in a predetermined color, changing the brightness, for example, by flashing, and increasing the brightness thereof relative to other portions.

Figure 19:
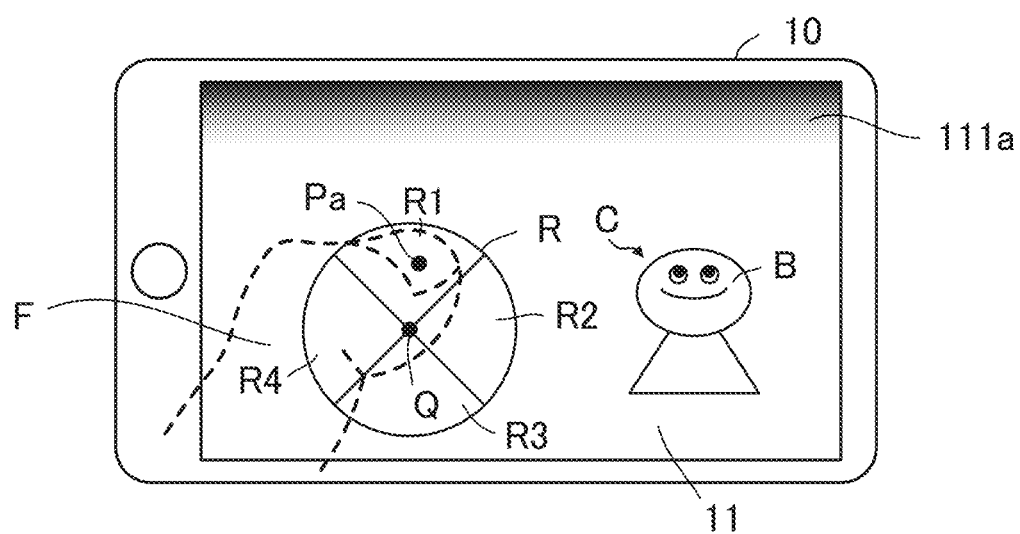
FIG. 19 is a diagram illustrating a display example in a case in which a determination result by an instruction determiner 147 indicates an upward direction.

FIG. 19 is a diagram illustrating a display example in a case in which the determination result by the instruction determiner 147 indicates an upward direction. In FIG. 19, as an example of a predetermined portion, an area 111a is shown. The area 111a is away from the operation area R by a predetermined distance or more, and is in a direction from the operation area R that is a direction corresponding to the direction indicated by the determination result from the instruction determiner 147. Specifically, in FIG. 19, an upper portion 111a having an upper edge portion of the touch panel 11 is displayed, as the area 111a, in a predetermined color. The predetermined portion is not limited to the portion illustrated in FIG. 19, and can be appropriately changed.

On the touch panel 11, the edge portion in the direction indicated by the determination result from the instruction determiner 147 is not likely to be hidden by a user's digit. Therefore, the user can easily recognize the determination result by the instruction determiner 147.

Modification A12

The instruction regarding the game described above is an example of an "instruction". The "instruction" may be a concept including an "instruction relating to a service provided by using the touch panel", in addition to the "instruction regarding the game".

The "first instruction regarding the game" described above is an example of the "first instruction", and the "second instruction regarding the game" described above is an example of the "second instruction".

The "first instruction" may be, for example, a concept including the "instruction relating to a service provided by using the touch panel 11", in addition to the "instruction regarding the game".

The "second instruction" may be, for example, a concept including the "instruction relating to a service provided by using the touch panel 11", in addition to the "instruction regarding the game".

Modification A13

The "direction regarding the game indicated by the instruction" described above is not limited to the direction indicated by a face direction instruction.

The "direction regarding the game indicated by the instruction" may be, for example, a direction in a virtual space V related to the game, or a direction on a screen in which an image of the game is displayed.

The direction in the virtual space related to the game is the direction of a change in one or both of the position and the posture of a virtual object (a game element related to the progress of the game) present in the virtual space V related to the game. For example, a "direction of movement of a character operated by a user" is cited as an example of the "direction in the virtual space related to the game", and furthermore, as an example of the "direction regarding the game indicated by the instruction".

The "virtual object present in the virtual space related to the game" is, for example, a character or an object of the game, or a virtual camera that takes a picture of the virtual space.

The "direction on a screen in which an image of the game is displayed" may be a direction of a change in one or both of the position and the posture of the virtual object (a game element related to the progress of the game), displayed in the image of the game, on the screen, or may be a direction of movement of a pointer or the like (a game element that is not related to the progress of the game) displayed on the menu screen related to the game.

Modification A14

The "first instruction regarding the game" described above is not limited to the offensive or defensive motion instruction.

The "first instruction" may be, for example, an instruction regarding a motion of a virtual object (a game element related to the progress of the game) present in the virtual space V related to the game, or an instruction of a direction regarding the game.

The "motion of a virtual object" may be an attack motion of the character as described above, or may be a defense motion of the character as described above, in a case in which the virtual object is a character of the game.

Modification A15

The "second instruction regarding the game" described above is not limited to the face direction instruction.

The "second instruction" may be, for example, an instruction of the direction regarding the game, or an instruction regarding a motion of a virtual object.

Modification A16

The "first area" described above is not limited to the offensive-defensive motion input area.

The "first area" is an area set on the touch panel 11, and is an example of an area for receiving the first instruction. The "first area" may be an area provided in a mode visible on the touch panel 11 for input of the first instruction, or may be a virtual area provided in a mode not visible on the touch panel 11 for input of the first instruction.

The "area provided in a mode visible on the touch panel" is, for example, a virtual key displayed on the touch panel 11.

The virtual key may be, for example, a key for inputting an attack motion, or a key for inputting a defense motion.

Modification A17

The "second area" described above is not limited to the face direction instruction input area.

The "second area" is an area different from the first area set on the touch panel 11, and is an example of an area for receiving the second instruction. For example, the "second area" may be an area provided in a mode visible on the touch panel 11 for input of the second instruction, or may be a virtual area provided in a mode not visible on the touch panel 11 for input of the second instruction.

The "area provided in a mode visible on the touch panel" may be, for example, a virtual direction key for upward, downward, rightward, and leftward directions displayed on the touch panel 11, or may be a virtual cross key displayed on the touch panel 11.

The "direction key for upward, downward, rightward, and leftward directions" may have an up key for specifying an upward direction, a down key for specifying a downward direction, a right key for specifying a rightward direction, and a left key for specifying a leftward direction.

In this case, the up key, the down key, the right key, and the left key may come in contact with each other, or may be arranged with a gap therebetween.

B Second Embodiment

Next, a second embodiment is described. In each example illustrated below, for elements having functions substantially identical to those of the first embodiment, reference signs used in the descriptions of the first embodiment are used, and detailed explanations of such elements are omitted as appropriate.

In the second embodiment, for example, the presence of input of an instruction with respect to the touch panel 11 is determined on the basis of information of an area on the touch panel 11 with which an object comes in contact.

The information processing apparatus 10 according to the second embodiment has a configuration substantially identical to a configuration of the first embodiment illustrated in FIG. 1 and FIG. 2. That is, the information processing apparatus 10 according to the second embodiment includes the touch panel 11, the pressure detector 12, the vibrator 13, the controller 14, and the storage device 15.

The touch panel 11 can receive input of an instruction regarding the direction on the touch panel 11 (hereinafter, "panel direction instruction").

The direction on the touch panel 11 is an example of the direction in the touch panel 11. The directions on the touch panel 11 are, for example, "right" and "left" specified by the X-axis illustrated in FIG. 1, and "up" and "down" specified by the Y-axis illustrated in FIG. 1.

The panel direction instruction is an example of an instruction regarding the direction in the touch panel.

The instruction regarding the direction in the touch panel is an example of the "instruction".

The "instruction" is a concept, for example, including an "instruction for selecting an option", in addition to the "instruction regarding the direction in the touch panel". The "instruction for selecting an option" is, for example, an instruction to select a numeral or a sign displayed on the touch panel 11 as the option.

Input of a panel direction instruction is performed by, for example, the thumb of a user. The thumb of the user is an example of an object.

The touch panel 11 also outputs touch information regarding an area of the touch panel 11 with which the object comes in contact (hereinafter, "touch area"). The touch information indicates at least an area of the touch area.

Figure 20:
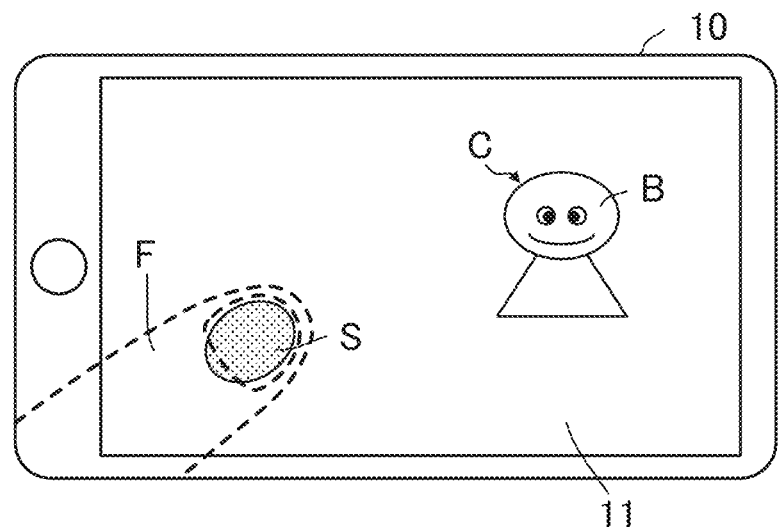
FIG. 20 is a diagram illustrating an example of a touch area S between the thumb F and the touch panel 11 in a reference state.

FIG. 20 is a diagram illustrating an example of a touch area S between a thumb F and the touch panel 11 in the reference state (a state in which the backside portion of the thumbnail of the pad of the thumb F is not tilted with respect to the touch panel 11).

Figure 21:
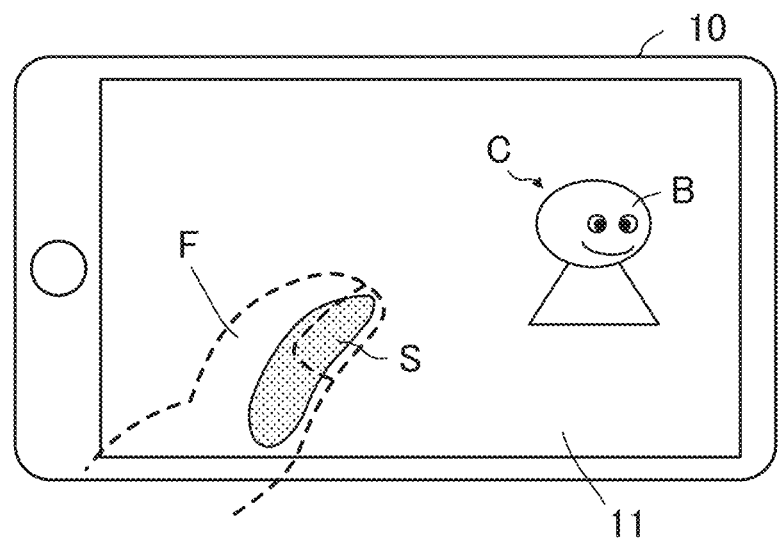
FIG. 21 is a diagram illustrating an example of the touch area S in a rightward instructed state.

FIG. 21 is a diagram illustrating an example of the touch area S in a state with the thumb F being tilted so that the thumb F is located on the right side on the touch panel 11 more than the state illustrated in FIG. 20 (hereinafter, "rightward instructed state").

Figure 22:
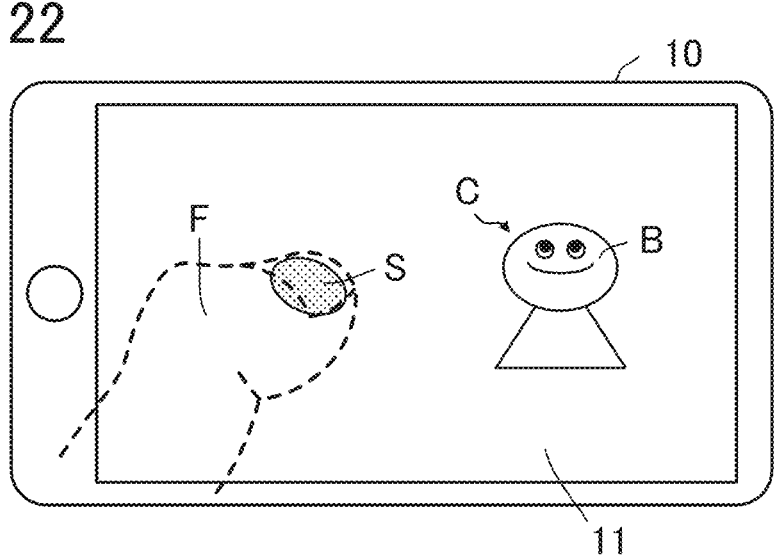
FIG. 22 is a diagram illustrating an example of the touch area S in an upward instructed state.

FIG. 22 is a diagram illustrating an example of the touch area S in a state with the tip of the thumb F being brought into contact with the touch panel 11 (hereinafter, "upward instructed state").

Although not illustrated, in a state in which the first joint portion of the thumb F, of the pad of the thumb F, comes in contact with the touch panel 11 (hereinafter, "downward instructed state"), the area of the touch area S becomes larger than the area of the touch area S in each of the cases illustrated from FIG. 20 to FIG. 22, and the shape of the touch area S is different from the shape of the touch area S in each of the cases illustrated from FIG. 20 to FIG. 22.

Although not illustrated, in a state of tilting the thumb F so that the thumb F is located on the left side on the touch panel 11 with respect to the thumb F in the state illustrated in FIG. 20 (hereinafter, "leftward instructed state"), the area of the touch area S becomes larger than the area of the touch area S in each of the cases illustrated in FIG. 21, and becomes smaller than the area of the touch area S in the downward instructed state. Furthermore, the shape of the touch area S in the leftward instructed state is different from the shape of the touch area S in each of the cases illustrated in FIG. 20 to FIG. 22 and from the shape of the touch area S in the downward instructed state.

In this manner, as a positional relationship between the thumb F and the touch panel 11 changes in a state with the thumb F coining in contact with the touch panel 11, the area and the shape of the touch area S change.

Therefore, the information processing apparatus 10 according to the second embodiment determines whether input of a panel direction instruction is present, in accordance with the touch area S.

Specifically, the information processing apparatus 10 according to the second embodiment determines that no input of a panel direction instruction is present, when the reference state occurs. The information processing apparatus 10 according to the second embodiment determines that "input of a panel direction instruction instructing the rightward direction is present" when the rightward instructed state occurs. The information processing apparatus 10 according to the second embodiment determines that "input of a panel direction instruction instructing the leftward direction is present" when the leftward instructed state occurs. The information processing apparatus 10 according to the second embodiment determines that "input of a panel direction instruction instructing the upward direction is present" when the upward instructed state occurs. The information processing apparatus 10 according to the second embodiment determines that "input of a panel direction instruction instructing the downward direction is present" when the downward instructed state occurs.

Figure 23:
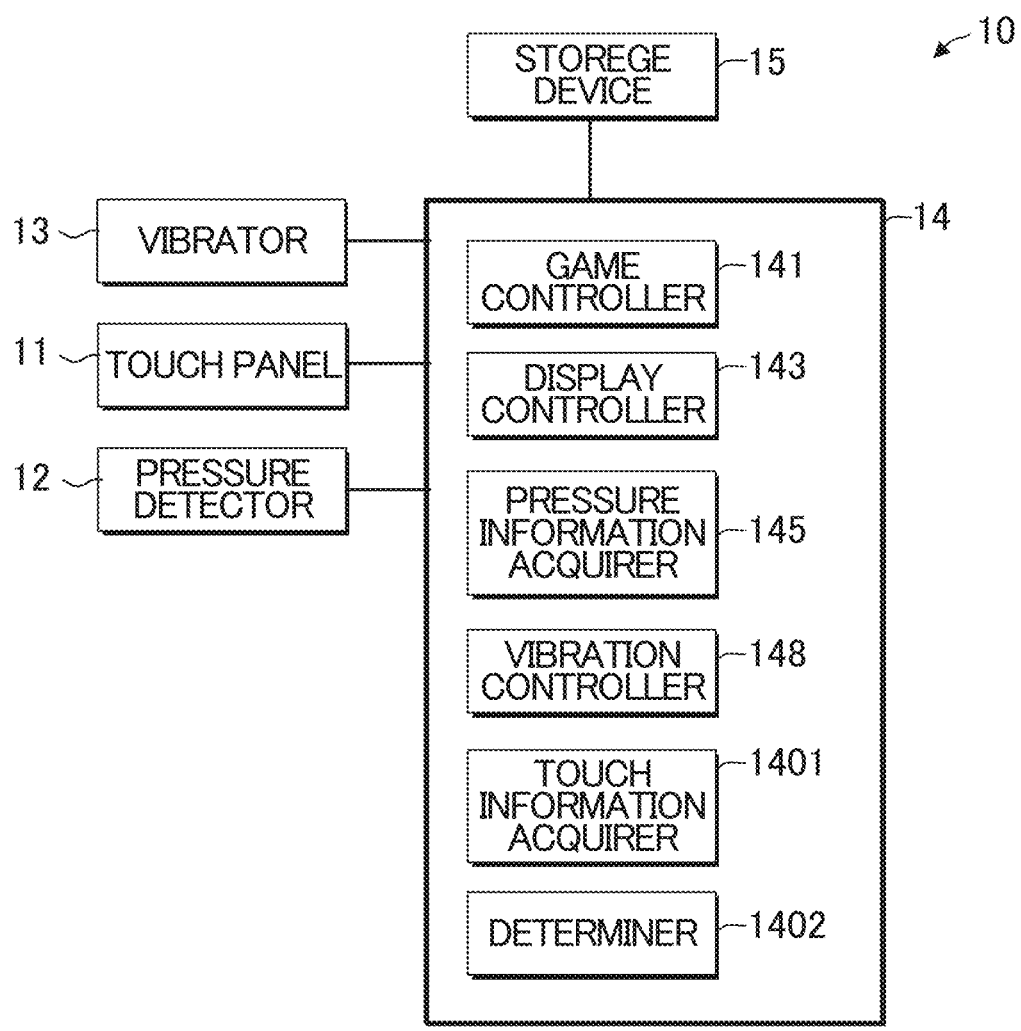
FIG. 23 is a block diagram illustrating a functional configuration of an information processing apparatus 10 according to a second embodiment.

FIG. 23 is a block diagram illustrating a functional configuration of the information processing apparatus 10 according to the second embodiment. The second embodiment is different from the first embodiment in that a touch information acquirer 1401 and a determiner 1402 are provided, but the setter 142, the touch position information acquirer 144, the input presence determiner 146, and the instruction determiner 147 are not provided.

The controller 14 according to the second embodiment executes a program stored in the storage device 15, thereby functioning as the game controller 141, the display controller 143, the pressure information acquirer 145, the vibration controller 148, the touch information acquirer 1401, and the determiner 1402. Some or all of the functions of the controller 14 may be realized by dedicated electronic circuitry.

The touch information acquirer 1401 acquires touch information output by the touch panel 11.

When the touch information acquired by the touch information acquirer 1401 indicates that a contact of an object with the touch panel 11 is present, for example, when the area of the touch area indicated by the touch information is greater than "0", the determiner 1402 determines whether input of a panel direction instruction is present, on the basis of the touch information. In the following descriptions, "touch information" represents "touch information acquired by the touch information acquirer 1401", unless otherwise described.

For example, the determiner 1402 determines whether input of a panel direction instruction is present, by referring to a determination table stored in the storage device 15.

Figures 24, 25:
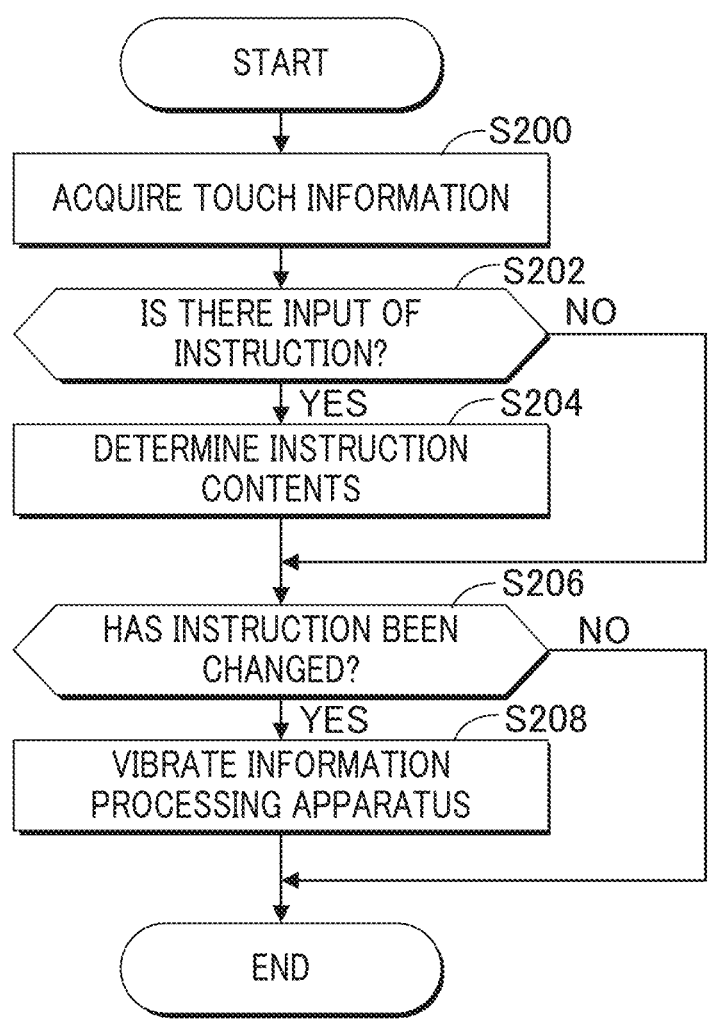
FIG. 24 is a diagram illustrating an example of a determination table J.
FIG. 25 is a flowchart for explaining an example of an operation of the information processing apparatus 10 according to the second embodiment.

FIG. 24 is a diagram illustrating an example of a determination table J. In the determination table J, an area of the touch area and a determination result are described in association with each other.

In FIG. 24, "neutral" in the determination result means that no input of a panel direction instruction is present. G1 to G10 are positive numbers satisfying G1≤G2≤G3≤G4≤G5≤G6≤G7≤G8≤G9≤G10. The association between the area of the touch area and the determination result illustrated in FIG. 24 is only an example, and can be appropriately changed. For example, in FIG. 24, "right" and "left" may be reversed.

In the following descriptions, a range from the area G1 to the area G2 inclusive is referred to as "first predetermined range". A range from the area G3 to the area G4 inclusive is referred to as "second predetermined range". A range from the area G5 to the area G6 inclusive is referred to as "third predetermined range". A range from the area G7 to the area G8 inclusive is referred to as "fourth predetermined range". A range from the area G9 to the area G10 inclusive is referred to as "fifth predetermined range".

For example, G1 to G10 are set so that when a user is operating the information processing apparatus 10 according to the second embodiment, the area of the touch area in the upward instructed state is included in the first predetermined range, the area of the touch area in the reference state is included in the second predetermined range, the area of the touch area in the rightward instructed state is included in the third predetermined range, the area of the touch area in the leftward instructed state is included in the fourth predetermined range, and the area of the touch area in the downward instructed state is included in the fifth predetermined range.

In the second embodiment, the game controller 141 reflects the determination result by the determiner 1402 in the progress of the game. For example, when the determiner 1402 determines that "no input of a panel direction instruction is present", the game controller 141 sets the direction of the face B to the front. Furthermore, when the determiner 1402 determines that "input of a panel direction instruction instructing the rightward direction is present", the game controller 141 sets the direction of the face B to the right.

The display controller 143 displays a game image based on the game image information generated by the game controller 141 on the touch panel 11. The vibration controller 148 causes the vibrator 13 to vibrate when the determination result by the determiner 1402 changes.

An example of an operation of the information processing apparatus 10 according to the second embodiment is described, with reference to FIG. 25. The operation illustrated in FIG. 25 is started when a predetermined start operation is performed. In the descriptions of the operation with reference to FIG. 25, it is assumed that a game image is displayed on the touch panel 11 by the display controller 143.

When the touch information acquirer 1401 acquires touch information (Step S200), the determiner 1402 determines whether input of a panel direction instruction with respect to the touch panel 11 is present, on the basis of the touch information, by referring to the determination table J (Step S202).

At Step S202, when the touch information indicates that a contact of an object with the touch panel 11 is present, and when the area of the touch area indicated by the touch information belongs to any one of the first predetermined range, the third predetermined range, the fourth predetermined range, and the fifth predetermined range, the determiner 1402 determines that input of a panel direction instruction is present.

The area of the touch area indicated by the touch information belonging to any one of the first predetermined range, the third predetermined range, the fourth predetermined range, and the fifth predetermined range (hereinafter, "first determination condition") is an example of the first condition.

On the other hand, even if the touch information indicates that a contact of an object with the touch panel 11 is present, when the area of the touch area indicated by the touch information does not belong to any one of the first predetermined range, the third predetermined range, the fourth predetermined range, and the fifth predetermined range, that is, the first determination condition is not satisfied, the determiner 1402 determines that no input of a panel direction instruction is present. Furthermore, when the first determination condition is not satisfied, the determiner 1402 determines that no input of a panel direction instruction is present, not only in the case in which no touch to the touch panel 11 is present, but also even if a touch to the touch panel 11 is present.

When having determined that input of a panel direction instruction is present (S202: YES), the determiner 1402 determines the contents of the panel direction instruction on the basis of the touch information (Step S204).

At Step S204, the determiner 1402 specifies a range to which the area of the touch area indicated by the touch information belongs, from among the first predetermined range, the third predetermined range, the fourth predetermined range, and the fifth predetermined range. Then, the determiner 1402 determines a determination result associated with the specified range in the determination table J (any one of upward, downward, rightward, and leftward) as the direction indicated by the panel direction instruction. Furthermore, the determiner 1402 stores the current determination result in the storage device 15, and deletes the determination result, which is different from both the current determination result and the previous determination result, from the storage device 15.

Subsequently, when the current determination result by the determiner 1402 has changed from the previous determination result by the determiner 1402 (S206: YES), the vibration controller 148 triggers the vibrator 13 to vibrate the entire information processing apparatus 10 including the touch panel 11 for the first predetermined time (Step S208).

When the determiner 1402 has determined that no input of a panel direction instruction is present (S202: NO), the determination at Step S204 is not performed, but the determination at Step S206 is performed. Furthermore, when the current determination result by the determiner 1402 has not changed from the previous determination result by the determiner 1402 (S206: NO), the vibration controller 148 does not trigger the vibrator 13.

According to the second embodiment, when the touch information indicates that a contact of an object with the touch panel 11 is present, the determiner 1402 determines whether input of a panel direction instruction is present, on the basis of the touch information. Therefore, a user can prevent input of an erroneous panel direction instruction to the touch panel 11, regardless of a touch position to the touch panel 11, by adjusting the area of the touch area.

When the first determination condition is satisfied, the determiner 1402 determines that input of a panel direction instruction is present. Therefore, a user can decrease a gap between the determination result regarding the panel direction instruction and user's sense of input of the panel direction instruction, by setting the first determination condition corresponding to the size of the user's thumb F.

In the second embodiment, for example, configurations exemplified below may be employed.

Modification B1

Figure 26:
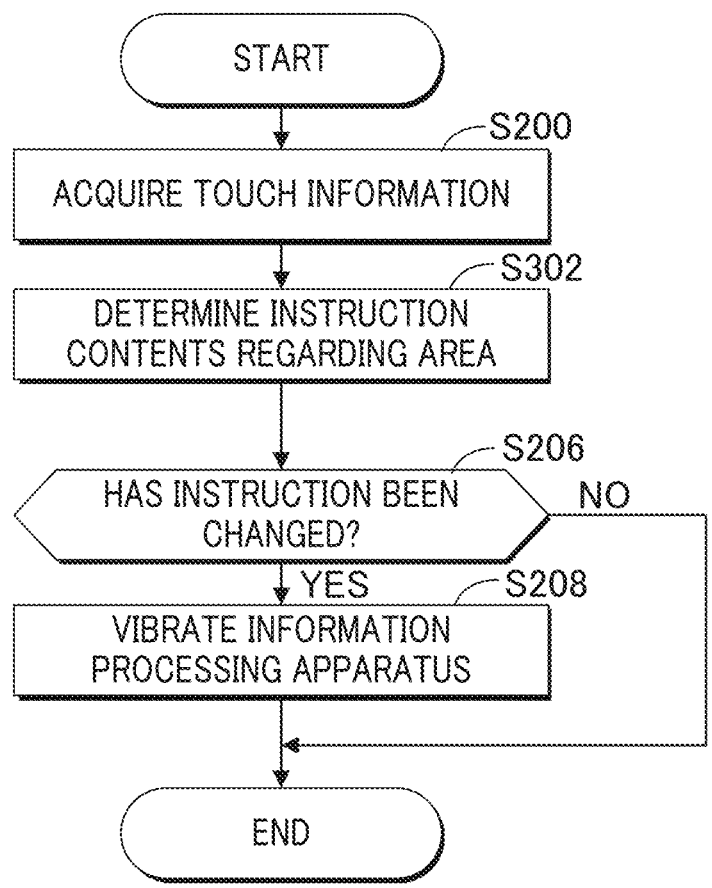
FIG. 26 is a flowchart for explaining another example of the operation of the information processing apparatus 10 according to the second embodiment.

The determiner 1402 may perform a process illustrated in FIG. 26. Specifically, in the second embodiment, a process of determining the presence of input of a panel direction instruction is performed first as illustrated in FIG. 25, and when input is present, a process of determining the instruction contents is performed. However, these processes may be performed collectively. In FIG. 26, processes substantially identical to processes illustrated in FIG. 25 are denoted by common reference signs. Processes illustrated in FIG. 26 are described below mainly for the points different from those illustrated in FIG. 25.

In FIG. 26, at Step S302, in a state in which the touch information indicates that a contact of an object with the touch panel 11 is present, when the area of the touch area indicated by the touch information belongs to the first predetermined range, the determiner 1402 determines that input of a panel direction instruction indicating an upward direction is present. When the area of the touch area belongs to the third predetermined range, the determiner 1402 determines that input of a panel direction instruction indicating a rightward direction is present. When the area of the touch area belongs to the fourth predetermined range, the determiner 1402 determines that input of a panel direction instruction indicating a leftward direction is present. When the area of the touch area belongs to the fifth predetermined range, the determiner 1402 determines that input of a panel direction instruction indicating a downward direction is present. When the area of the touch area does not belong to any one of the first predetermined range, the third predetermined range, the fourth predetermined range, and the fifth predetermined range, the determiner 1402 determines that no input of a panel direction instruction is present.

According to a modification B1, the processes at Step S202 and Step S204 illustrated in FIG. 25 are performed collectively at Step S302.

Therefore, the determination processing can be simplified as compared to the second embodiment.

Modification B2

In the second embodiment, when the difference between the area of the touch area at a time when a rightward instructed state occurs and the area of the touch area at a time when a leftward instructed state occurs is not large, there is a possibility that erroneous determination may occur in the determination of the rightward direction and the determination of the leftward direction with regard to the panel direction instruction.

Therefore, the rightward direction and the leftward direction may be determined with regard to the panel direction instruction, by supplemental usage of the touch position to the touch panel 11.

The hardware configuration of the information processing apparatus 10 according to a modification B2 is substantially identical to that of the information processing apparatus 10 according to the first embodiment illustrated in FIG. 1 and FIG. 2. That is, the information processing apparatus 10 according to the modification B2 includes the touch panel 11, the pressure detector 12, the vibrator 13, the controller 14, and the storage device 15.

Figure 27:
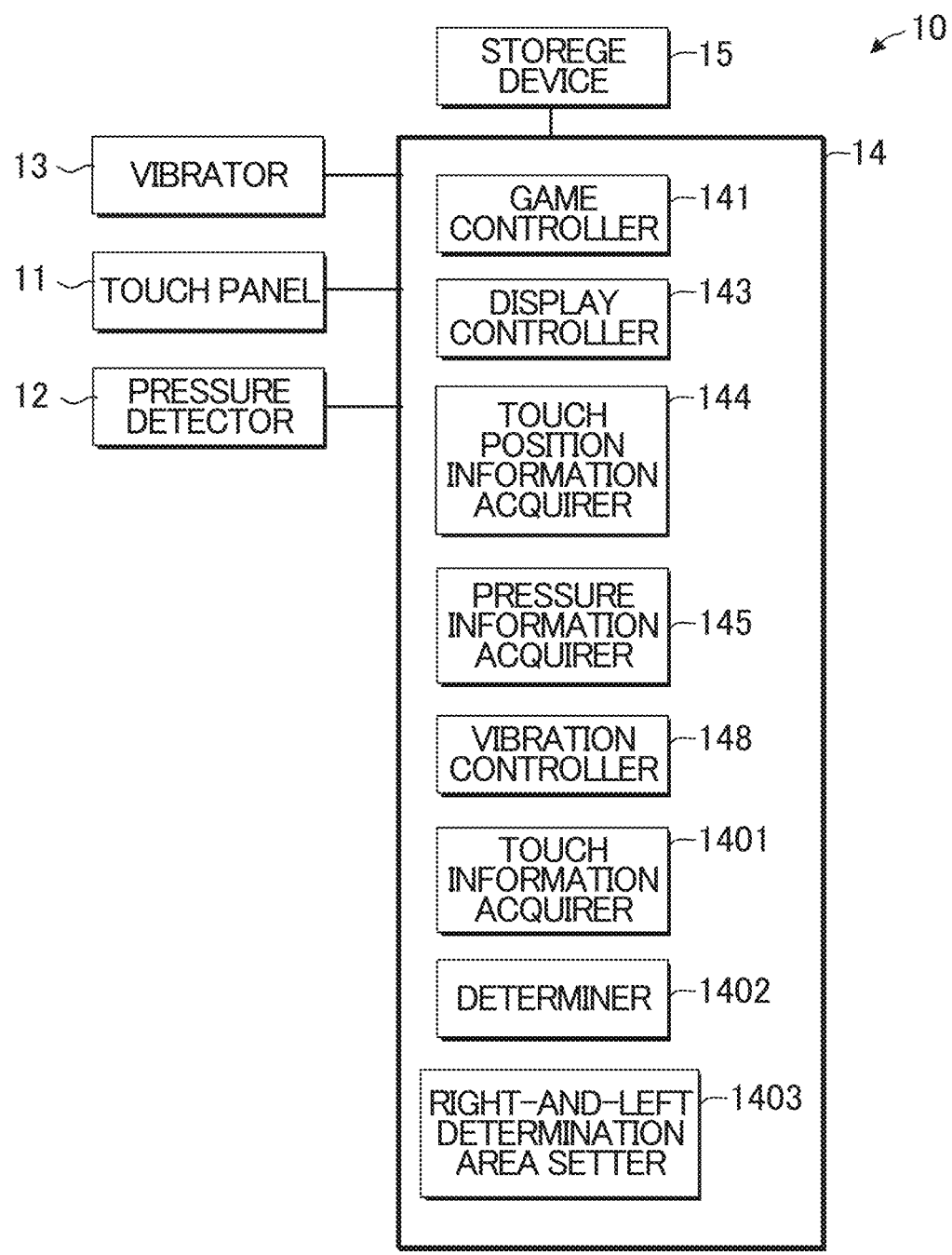
FIG. 27 is a block diagram illustrating a functional configuration of an information processing apparatus 10 according to a modification B2.

FIG. 27 is a block diagram illustrating a functional configuration of the information processing apparatus 10 according to the modification B2. The controller 14 according to the modification B2 executes a program stored in the storage device 15, thereby functioning as the game controller 141, the display controller 143, the touch position information acquirer 144, the pressure information acquirer 145, the vibration controller 148, the touch information acquirer 1401, the determiner 1402, and a right-and-left determination area setter 1403. Some or all of the functions of the controller 14 may be realized by dedicated electronic circuitry.

The modification B2 is different from the second embodiment and the modification B1 in that the touch position information acquirer 144 and the right-and-left determination area setter 1403 are provided.

Figures 28, 29:
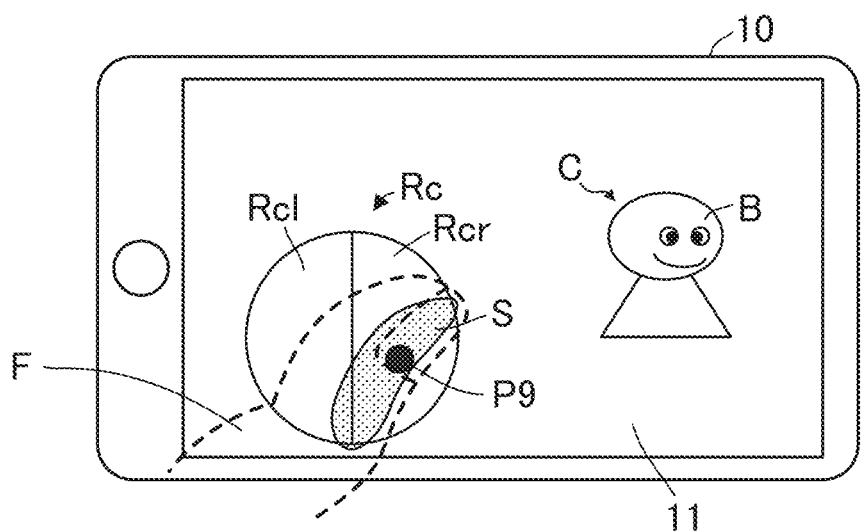
FIG. 28 is a diagram illustrating an example of a right-and-left determination area Rc.
FIG. 29 is a diagram illustrating an example of a determination table J1.

The right-and-left determination area setter 1403 sets a right-and-left determination area Rc on the touch panel 11, for example, as illustrated in FIG. 28. The display controller 143 displays the right-and-left determination area Rc set by the right-and-left determination area setter 1403 on the touch panel 11. The right-and-left determination area Rc includes a right determination area Rcr, and a left determination area Rbl set on the left side of the right determination area Rcr.

When the area of the touch area belongs to either the third predetermined range or the fourth predetermined range, the determiner 1402 determines whether a touch position indicated by the touch position information acquired by the touch position information acquirer 144 belongs to the right determination area Rcr or the left determination area Rcl.

Specifically, when the touch position belongs to the right determination area Rcr, the determiner 1402 determines that the panel direction instruction indicates the rightward direction. On the other hand, when the touch position belongs to the left determination area Rcl, the determiner 1402 determines that the panel direction instruction indicates the leftward direction.

The right-and-left determination area setter 1403 may fix the position of the right-and-left determination area Rc on the touch panel 11 without performing resetting, or may reset the right-and-left determination area Rc in accordance with the touch position.

For example, the right-and-left determination area setter 1403 may set the right-and-left determination area Rc at a position on the touch panel 11 based on the touch position at the time when the determiner 1402 determines that no input of a panel direction instruction is present.

As an example, the right-and-left determination area setter 1403 sets the right-and-left determination area Rc so that a position of the center of gravity of the right-and-left determination area Rc is arranged at a touch position on the touch panel 11 at the time when the determiner 1402 determines that no input of a panel direction instruction is present.

According to the modification B2, it is determined, in accordance with the touch position to the touch panel 11, whether a panel direction instruction indicates the rightward direction or the leftward direction. Therefore, the accuracy of the determination can be improved as compared to a configuration that determines whether a panel direction instruction indicates the rightward direction or the leftward direction, without using the touch position to the touch panel 11.

In the modification B2, the touch position is used to determine the rightward and leftward directions. However, the touch position may be used to determine upward, downward, rightward, and leftward directions.

Modification B3

In the second embodiment, the modification B1, and the modification B2, the determiner 1402 may determine whether input of a panel direction instruction to the touch panel 11 is present, on the basis of a speed of a change in the area of the touch area indicated by the touch information. For example, the determiner 1402 determines that input of a panel direction instruction to the touch panel 11 is present when the speed of a change in the area of the touch area indicated by the touch information is equal to or greater than a third speed reference value.

A state in which the speed of a change in the area of the touch area becomes equal to or greater than a certain value is assumed to be a state in which a user is inputting some kind of instruction to the touch panel 11. Therefore, it can be determined whether input of a panel direction instruction is present, on the basis of the speed of a change in the area of the touch area indicated by the touch information.

According to the configuration in which it is determined whether input of a panel direction instruction to the touch panel 11 is present, on the basis of the speed of a change in the area of the touch area indicated by the touch information, erroneous determination due to one or both of an individual difference of the size of a digit that touches the touch panel 11, and an individual difference of the strength of a pressing force with respect to the touch panel 11 at the time of touching the touch panel 11, can be reduced, as compared to a configuration in which it is determined whether input of a panel direction instruction to the touch panel 11 is present, on the basis of the size of the area of the touch area indicated by the touch information.

The determiner 1402 may determine that input of a panel direction instruction to the touch panel 11 is present, when the rise rate of the speed of a change in the area of the touch area indicated by the touch information is equal to or greater than a fourth speed reference value.

The "third speed reference value" and the "fourth speed reference value" may each be a specific value or be a value changed by a user, for example.

Modification B4

In the second embodiment, the modification B1, and the modification B2, the touch information may not indicate the area of the touch area, but may indicate at least the shape of the touch area.

In this case, a determination table J1 as illustrated in FIG. 29 is used, instead of the determination table J as illustrated in FIG. 24. In the determination table J1, an aspect ratio (length/width) of the touch area and a determination result are described in association with each other. The aspect ratio of the touch area (hereinafter, simply "aspect ratio") is an example of an index value defined in accordance with the shape of the touch area.

In a modification B4, as in the modification A10, the length of a long axis of an ellipse in a case in which the touch area is approximated by the ellipse is regarded as a longitudinal length of the touch area, and the length of a short axis of the ellipse is regarded as a lateral length of the touch area.

In FIG. 29, H1 to H10 are positive numbers satisfying $H1 \leq H2 \leq H3 \leq H4 \leq H5 \leq H6 \leq H7 \leq H8 \leq H9 \leq H10$. The association between the aspect ratio of the touch area and the determination result illustrated in FIG. 29 is only an example, and may be appropriately changed. For example, in FIG. 29, "right" and "left" may be reversed.

In the following descriptions, a range from the aspect ratio H1 to the aspect ratio H2 inclusive is referred to as "sixth predetermined range". A range from the aspect ratio H3 to the aspect ratio H4 inclusive is referred to as "seventh predetermined range". A range from the aspect ratio H5 to the aspect ratio H6 inclusive is referred to as "eighth predetermined range". A range from the aspect ratio H7 to the aspect ratio H8 inclusive is referred to as "ninth predetermined range". A range from the aspect ratio H9 to the aspect ratio H10 inclusive is referred to as "tenth predetermined range".

For example, H1 to H10 are each set so that when a user is operating the information processing apparatus 10 according to the modification B4, the aspect ratio in the reference state is included in the sixth predetermined range, the aspect ratio in the upward instructed state is included in the seventh predetermined range, the aspect ratio in the downward instructed state is included in the eighth predetermined range, the aspect ratio in the leftward instructed state is included in the ninth predetermined range, and the aspect ratio in the rightward instructed state is included in the tenth predetermined range.

In the modification B4, the operation illustrated in FIG. 25 is performed as described below.

That is, when the touch information acquirer 1401 acquires the touch information (Step S200), the determiner 1402 determines whether input of a panel direction instruction to the touch panel 11 is present, on the basis of the touch information by referring to the determination table J1 (Step S202).

At Step S202, when the touch information indicates that a contact of an object with the touch panel 11 is present, the determiner 1402 calculates the aspect ratio of the touch area indicated by the touch information. When the calculated aspect ratio belongs to any one of the seventh predetermined range, the eighth predetermined range, the ninth predetermined range, and the tenth predetermined range, the determiner 1402 determines that input of a panel direction instruction is present.

The aspect ratio of the touch area being included in any one of the seventh predetermined range, the eighth predetermined range, the ninth predetermined range, and the tenth predetermined range (hereinafter, "second determination condition") is an example of a second condition.

On the other hand, when the aspect ratio of the touch area does not belong to any one of the seventh predetermined range, the eighth predetermined range, the ninth predetermined range, and the tenth predetermined range, that is, the second determination condition is not satisfied, the determiner 1402 determines that input of a panel direction instruction is present.

When determining that input of a panel direction instruction is present (S202: YES), the determiner 1402 determines the contents of the panel direction instruction on the basis of the touch information (Step S204).

At Step S204, the determiner 1402 specifies a range to which the aspect ratio of the touch area belongs, from among the seventh predetermined range, the eighth predetermined range, the ninth predetermined range, and the tenth predetermined range. The determiner 1402 determines a determination result associated with the specified range in the determination table J1 (any one of upward, downward, rightward, and leftward) as the direction indicated by the panel direction instruction. Furthermore, the determiner 1402 stores the current determination result in the storage device 15, and deletes the determination result, which is different from both the current determination result and the previous determination result, from the storage device 15.

Subsequently, when the current determination result by the determiner 1402 has changed from the previous determination result by the determiner 1402 (S206: YES), the vibration controller 148 triggers the vibrator 13 to vibrate the entire information processing apparatus 10 including the touch panel 11 for the first predetermined time (Step S208).

According to the modification B4, when the second determination condition is satisfied, the determiner 1402 determines that input of a panel direction instruction is present. Therefore, for example, when the second determination condition is set in accordance with the shape of the user's thumb F, a gap between the determination result regarding the panel direction instruction and user's sense of input of the panel direction instruction can be decreased.

In the modification B4, in a state in which the touch information indicates that a contact of an object with the touch panel 11 is present, Step S302 of the operations illustrated in FIG. 26 may be performed as described below.

When the aspect ratio of the touch area belongs to the seventh predetermined range, the determiner 1402 determines that input of a panel direction instruction indicating the upward direction is present.

When the aspect ratio of the touch area belongs to the eighth predetermined range, the determiner 1402 determines that input of a panel direction instruction indicating the downward direction is present.

When the aspect ratio of the touch area belongs to the ninth predetermined range, the determiner 1402 determines that input of a panel direction instruction indicating the leftward direction is present.

When the aspect ratio of the touch area belongs to the tenth predetermined range, the determiner 1402 determines that input of a panel direction instruction indicating the rightward direction is present.

When the aspect ratio of the touch area does not belong to any one of the seventh predetermined range, the eighth predetermined range, the ninth predetermined range, and the tenth predetermined range, the determiner 1402 determines that no input of a panel direction instruction is present.

Furthermore, in the modification B4, information indicating whether the approximated ellipse is vertically long or horizontally long (hereinafter, "vertically long horizontally long information") may be further shown on the touch panel 11 in FIG. 29. In this case, the determination result is associated with respect to a combination of the aspect ratio and the vertically long horizontally long information.

Modification B5

In the modification B4, the determiner 1402 may determine whether input of a panel direction instruction to the touch panel 11 is present, on the basis of the speed of a change in the aspect ratio of the touch area. For example, when the speed of a change in the aspect ratio of the touch area is equal to or greater than a fifth speed reference value, the determiner 1402 determines that input of a panel direction instruction to the touch panel 11 is present.

A state in which the speed of a change in the aspect ratio of the touch area becomes equal to or greater than a certain value is assumed to be a state in which a user is inputting some kind of instruction to the touch panel 11. Therefore, it can be determined whether input of a panel direction instruction is present, on the basis of the speed of a change in the aspect ratio of the touch area.

According to the configuration in which it is determined whether input of a panel direction instruction to the touch panel 11 is present on the basis of the speed of a change in the aspect ratio of the touch area, erroneous determination due to an individual difference of the size of a digit that touches the touch panel 11 can be reduced, as compared to a configuration in which it is determined whether input of a panel direction instruction to the touch panel 11 is present on the basis of the size of the aspect ratio of the touch area.

When a rise rate of the speed of a change in the aspect ratio of the touch area is equal to or greater than a sixth speed reference value, the determiner 1402 may determine that input of a panel direction instruction to the touch panel 11 is present.

The "fifth speed reference value" and the "sixth speed reference value" may each be, for example, a fixed value or a value changed by a user.

Modification B6

In the second embodiment, and the modifications B1 to B3, when the touch information indicates the area and the shape of the touch area, the determiner 1402 may determine whether input of a panel direction instruction to the touch panel 11 is present, by using both the determination table J and the determination table J1.

For example, when both the first determination condition and the second determination condition are satisfied in a state in which the touch information indicates that a contact of an object with the touch panel 11 is present, the determiner 1402 determines that input of a panel direction instruction to the touch panel 11 is present.

Furthermore, the determiner 1402 determines the panel direction instruction in the following manner. That is, when the area of the touch area belongs to the first predetermined range and the aspect ratio of the touch area belongs to the seventh predetermined range, the determiner 1402 determines that input of a panel direction instruction indicating the upward direction is present. When the area of the touch area belongs to the fifth predetermined range and the aspect ratio of the touch area belongs to the eighth predetermined range, the determiner 1402 determines that input of a panel direction instruction indicating the downward direction is present. When the area of the touch area belongs to the fourth predetermined range and the aspect ratio of the touch area belongs to the ninth predetermined range, the determiner 1402 determines that input of a panel direction instruction indicating the leftward direction is present. When the area of the touch area belongs to the third predetermined range and the aspect ratio of the touch area belongs to the tenth predetermined range, the determiner 1402 determines that input of a panel direction instruction indicating the rightward direction is present.

In a modification B6, the determiner 1402 determines whether input of a panel direction instruction is present, by using the area and the shape of the touch area. Therefore, the accuracy of the determination can be improved as compared to a configuration in which it is determined whether input of a panel direction instruction is present by using only one of the area and the shape of the touch area.

Modification B7

In the second embodiment, and the modifications B1 to B3, the determiner 1402 may determine whether input of a panel direction instruction is present on the basis of both the area indicated by the touch information and the pressure information.

For example, in the second embodiment, when the pressure indicated by the pressure information is equal to or greater than the first threshold in the state in which the first determination condition is satisfied, the determiner 1402 determines that input of a panel direction instruction is present. The pressure indicated by the pressure information being equal to or greater than the first threshold in the state in which the first determination condition is satisfied is an example of a third condition. When it is determined that input of a panel direction instruction is present, for example, processes at and after S204 illustrated in FIG. 25 are performed.

In the modification B4 and a modification B5, the determiner 1402 may determine whether input of a panel direction instruction is present, on the basis of both the shape indicated by the touch information and the pressure information.

For example, in the modification B4, when the pressure indicated by the pressure information is equal to or greater than the first threshold in a state in which the second determination condition is satisfied, the determiner 1402 determines that input of a panel direction instruction is present. The pressure indicated by the pressure information being equal to or greater than the first threshold in the state in which the second determination condition is satisfied is another example of the third condition. When it is determined that input of a panel direction instruction is present, for example, the processes at and after S204 illustrated in FIG. 25 are performed.

In the modification B6, the determiner 1402 may determine whether input of a panel direction instruction is present, on the basis of the area and the shape indicated by the touch information and the pressure information.

For example, in the modification B6, when the pressure indicated by the pressure information is equal to or greater than the first threshold in a state in which the first determination condition and the second determination condition are satisfied, the determiner 1402 determines that input of a panel direction instruction is present. The pressure indicated by the pressure information being equal to or greater than the first threshold in the state in which the first determination condition and the second determination condition are satisfied is another example of the third condition. When it is determined that input of a panel direction instruction is present, in the modification B6, the determiner 1402 determines the panel direction instruction as described above.

Furthermore, the third condition may be a condition in which the pressure indicated by the pressure information is equal to or greater than a third threshold. Here, the "third threshold" is a threshold for determining whether input of an instruction is present, and may be, for example, a fixed value or a value changed by a user.

Furthermore, the determiner 1402 may correct the first determination condition on the basis of the pressure indicated by the pressure information in a state in which the area of the touch area belongs to the second predetermined range.

When an object coining in contact with the touch panel 11 is a human digit, as the pressure indicated by the pressure information becomes less in the state in which the area of the touch area belongs to the second predetermined range, it is estimated that the digit is large. The determiner 1402 corrects some or all of the areas G1 to G10 shown in the determination table J in accordance with the estimation. For example, as the pressure indicated by the pressure information becomes less in the state in which the area of the touch area belongs to the second predetermined range, the determiner 1402 increases some or all of the areas G1 to G10.

The determiner 1402 may correct the second determination condition on the basis of the pressure indicated by the pressure information in a state in which the aspect ratio of the touch area belongs to the sixth predetermined range. For example, as the pressure indicated by the pressure information becomes less in the state in which the aspect ratio of the touch area belongs to the sixth predetermined range, the determiner 1402 increases some or all of the aspect ratios H1 to H10.

Modification B8

In the second embodiment and the modifications B1 to B7, the display controller 143 may display the information regarding the direction indicated by the panel direction instruction, from among the determination results by the determiner 1402, on the touch panel 11 as in a modification A11 described above.

Modification B9

The "object" described above is not limited to the thumb F of a user.

The object may be an object having a feature in which at least one of the area or the shape of the touch area on the touch panel 11 with which the object comes in contact changes in accordance with a change in the posture of the object in a state in which the object comes in contact with the touch panel. The object may be an object having a feature in which at least one of the area or the shape of the touch area on the touch panel 11 with which the object comes in contact changes in accordance with a change in the pressure applied to the touch panel 11 in a state in which the object comes in contact with the touch panel 11.

Specifically, the "object" may be a human digit including the thumb F described above, or a pointer having a pen shape of which a tip end is formed by an elastic body such as one of rubber.

Modification B10

The "instruction regarding the direction in the touch panel" is not limited to the panel direction instruction.

The "instruction regarding the direction in the touch panel" is an instruction including information indicating a direction, for example, based on the "touch panel 11" or a "coordinate system provided on the touch panel 11".

The information indicating the direction based on the "touch panel 11" or the "coordinate system provided on the touch panel 11" may be, for example, information indicated by a vector defined in the coordinate system provided on the touch panel 11.

Modification B11

The "direction in the touch panel" described above is not limited to a direction on the touch panel 11.

The "direction in the touch panel" may be, for example, a direction on a plane in which the touch panel 11 is present, or may include a component in a normal direction with respect to the touch panel 11.

The "direction on a plane in which the touch panel 11 is present" may be, for example, a direction indicated by upward, downward, rightward, and leftward direction keys or indicated by a cross key displayed or virtually set on the touch panel 11.

Modification B12

The "first condition" described above is not limited to the "first determination condition".

The first condition may be, for example, a "condition that the area of the touch area S does not belong to a first range", or a "condition that the area of the touch area S belongs to a second range".

The "first range" may be a range in which the area of the touch area S can change, for example, in a state in which the pressure between an object and the touch panel 11 is equal to or less than a first predetermined value.

The "second range" may be, for example, a range of the area that is different from the first range, the maximum of the range of the area being equal to or less than the area of the touch panel 11.

The "first range" and the "second range" may each be, for example, a fixed range, or a range changed by a user.

Modification B13

The "second condition" described above is not limited to the "second determination condition".

The second condition may be, for example, a condition in which one or a plurality of index values defined in accordance with the shape of the touch area S have a predetermined feature.

Here, "one or a plurality of index values" may be, for example, the aspect ratio of the touch area S described above, the direction of the touch area S, or may include both the aspect ratio of the touch area S and the direction of the touch area S.

The "direction of the touch area S" may be, in a case in which the touch area S is approximated by an ellipse, a direction of a long axis of the ellipse as seen from the coordinate system fixed on the touch panel 11 (for example, a value of each component of a unit vector extending in the long axis direction), or a direction of a short axis of the ellipse (for example, a value of each component of a unit vector extending in the short axis direction).

In a case in which both the aspect ratio of the touch area S and the direction of the touch area S are used, for example, determination of whether the state is a neutral state is performed on the basis of the aspect ratio of the touch area S shown in the determination table J1, and determination of upward, downward, rightward, and leftward directions is performed on the basis of the direction of the touch area S.

An angle formed by the long axis of the ellipse approximating the touch area S and the Y-axis increases in the order of the rightward instructed state, the downward instructed state, the leftward instructed state, and the upward instructed state. In the rightward instructed state, the downward instructed state, the leftward instructed state, the direction of the long axis of the ellipse becomes substantially parallel to a length direction of the thumb F. However, in the upward instructed state, the direction of the long axis of the ellipse becomes substantially parallel to a width direction of the thumb F.

Therefore, determination of upward, downward, rightward, and leftward directions on the basis of the direction of the touch area S can be performed on the basis of the angle formed by the long axis of the ellipse approximating the touch area S and the Y-axis.

When "one or a plurality of index values" is the aspect ratio of the touch area", the "second condition" may be, for example, a "condition in which the aspect ratio does not belong to a third range", or a "condition in which the aspect ratio belongs to a fourth range".

The "third range" may be, for example, a range in which the aspect ratio of the touch area S can change in a state in which the pressure between the object and the touch panel 11 is equal to or less than a second predetermined value.

The "fourth range" may be, for example, a range excluding the third range from a range greater than "0".

When "one or a plurality of index values" is the "direction of the touch area S", the "second condition" may be, for example, a "condition that the long axis direction of the ellipse approximating the touch area S does not belong to a fifth range", or a "condition that the long axis direction of the ellipse approximating the touch area S belongs to a sixth range".

The "fifth range" may be, for example, a range in which the long axis direction of the ellipse approximating the touch area can change in the coordinate system fixed on the touch panel 11, in a case in which the pressure between the object and the touch panel 11 is equal to or less than a third predetermined value.

The "sixth range" may be, for example, a range excluding the fifth range from a range in the coordinate system fixed on the touch panel 11. The third to sixth ranges may each be, for example, a fixed range or a range changed by a user.

C: Other Modifications

The following modifications may be made to at least any one of the first embodiment, the second embodiment, the modifications A1 to A17, and the modifications B1 to B13.
Modification C1

The direction indicated by a face direction instruction or the direction indicated by a panel direction instruction is not limited to the four directions of up, down, right, and left. It is sufficient for the number of directions indicated by these instructions to be one or more, for example, it may be two, it may be eight, or it may be a direction of a vector starting from the reference point and ending at the touch position.
Modification C2

The instruction input to the touch panel 11 is not limited to the instruction regarding the direction, and may be, for example, an instruction regarding selection. As an example, an instruction indicating one option selected from a plurality of options is cited. In this case, for example, an area of the option is set instead of the operation area R illustrated in FIG. 1, and a first option, a second option, a third option, and a fourth option are set in the area of the option.
Modification C3

The vibration controller 148 may be omitted. Some or all of the touch panel 11, the pressure detector 12, and the vibrator 13 may be external elements. Furthermore, some or all of the game controller 141, the setter 142, the display controller 143, the detector 149, and the right-and-left determination area setter 1403 may be external elements. Furthermore, the program described above stored in the storage device 15 may be distributed from a server apparatus (not shown) to the information processing apparatus 10. For example, the server apparatus distributes the program described above stored in a storage device provided in the server apparatus to the information processing apparatus 10, and the information processing apparatus 10 stores the program described above distributed from the server apparatus in the storage device 15. In this case, the storage device provided in the server apparatus is an example of a computer-readable recording medium (for example, a computer-readable non-transitory recording medium).

D: Other Aspects

Following aspects are included in at least any one of the first embodiment, the second embodiment, the modifications A1 to A17, and the modifications B1 to B13.
Aspect D1

A recording medium having recorded therein a program for causing a processor to function as:

a touch position information acquirer configured to acquire touch position information regarding a touch position on a touch panel;

a pressure information acquirer configured to acquire pressure information regarding a pressure applied to the touch panel;

an input presence determiner configured to determine, based on the pressure information acquired by the pressure information acquirer, whether input of an instruction is present; and an instruction determiner configured to determine contents of the instruction based on the touch position information acquired by the touch position information acquirer, when a determination result by the input presence determiner is affirmative.
Aspect D2

A recording medium having recorded therein a program for causing a processor to function as:

a touch information acquirer configured to acquire touch information regarding at least one of an area and a shape of a touch area on a touch panel with which an object comes in contact; and a determiner configured to determine, when the touch information acquired by the touch information acquirer indicates that a contact of the object with the touch panel is present, whether input of an instruction is present based on the touch information.
Aspect D3

A recording medium having recorded therein a program for causing a processor to function as:

a touch position information acquirer configured to acquire touch position information regarding a touch position on a touch panel, the touch panel including a first area for inputting a first instruction and a second area for inputting a second instruction;

a pressure information acquirer configured to acquire pressure information regarding a pressure applied to the touch panel;

a first determiner configured to determine, based on the touch position information acquired by the touch position information acquirer, whether input of the first instruction is present; and a second determiner configured to determine whether input of the second instruction is present, based on both the pressure information, which is acquired by the pressure information acquirer when the touch position information acquired by the touch position information acquirer indicates that a touch to the second area is present, and a determination result by the first determiner based on the touch position information.

Aspect D4

A recording medium having recorded therein a program for causing a processor to function as:

a touch position information acquirer configured to acquire touch position information regarding a touch position on a touch panel, the touch panel including a first area for inputting a first instruction and a second area for inputting a second instruction;

a pressure information acquirer configured to acquire pressure information regarding a pressure applied to the touch panel;

a first determiner configured to determine, based on the touch position information acquired by the touch position information acquirer, whether input of the first instruction is present; and a second determiner configured to determine, when a determination result by the first determiner based on the touch position information indicative of presence of a touch to the second area is negative, whether input of the second instruction is present based on the pressure information acquired by the pressure information acquirer when the touch position information acquirer acquires the touch position information, wherein processes based on the first instruction and the second instruction are not affected by the touch to the second area, during a period in which the determination result by the first determiner based on the touch position information indicative of the presence of the touch to the second area is affirmative.

E: Supplemental Notes

For example, the present invention is understood as follows on the basis of the above descriptions. In the following descriptions, reference signs in the drawings are denoted in parentheses for convenience in order to facilitate understanding of each aspect, but the present invention is not limited to these aspects illustrated in the drawings.

Supplemental Note 1

A recording medium according to one aspect of the present invention has recorded therein a program that causes a processor (14) to function as: a touch position information acquirer (144) configured to acquire touch position information regarding a touch position on a touch panel (11); a pressure information acquirer (145) configured to acquire pressure information regarding a pressure applied to the touch panel (11); an input presence determiner (146) configured to determine, based on the pressure information acquired by the pressure information acquirer (145), whether input of an instruction regarding a game is present; and an instruction determiner (147) configured to determine a direction regarding the game indicated by the instruction, based on the touch position information acquired by the touch position information acquirer (144), when a determination result by the input presence determiner (146) is affirmative.

According to the present aspect, it is determined whether input of an instruction regarding the game is present, based on the pressure applied to the touch panel (11). Therefore, a user can realize a state in which no input of an instruction regarding the game is present, by adjusting the pressure applied to the touch panel (11), even if the user is touching the touch panel (11). Accordingly, the user can reduce erroneous input based on a touch to a position not intended by the user. Furthermore, the user can realize a state in which an instruction regarding the game is not input without a motion requiring load such as releasing a thumb (F) from the touch panel (11). Therefore, the function of the UI (User Interface) can be enhanced, in other words, the function of the UI can be improved.

In this aspect, the "direction regarding a game indicated by an instruction" may be, for example, a direction in a virtual space related to the game, or may be a direction on a screen in which an image of the game is displayed.

The "direction in a virtual space related to a game" is, for example, a change direction of one or both of the position and the posture of a virtual object present in the virtual space related to the game (a game element related to the progress of the game).

The "virtual object present in a virtual space related to a game" is, for example, a character or an object of the game, or a virtual camera that takes a picture of the virtual space.

The "direction on a screen in which an image of a game is displayed" may be, for example, a change direction of one or both of the position and the posture of a virtual object (a game element related to the progress of the game) in the image of the game, or may be a moving direction of a pointer or the like (a game element that is not related to the progress of the game) on the menu screen related to the game.

The "recording medium" may be incorporated in or attached to an information processing apparatus having a processor that executes a program. Furthermore, in a situation in which a program is recorded in a storage device provided in a server, and the server distributes the program recorded in the storage device, the storage device provided in the server is an example of the "recording medium".

Supplemental Note 2

In a recording medium according to another aspect of the present invention, in the recording medium according to the supplemental note 1, the input presence determiner (146) is configured to determine, when the pressure indicated by the pressure information is equal to or greater than a threshold, that the input is present.

According to the present aspect, a user can prevent input of an instruction regarding the game to the touch panel (11), by realizing the pressure applied to the touch panel (11) less than the first threshold, even if the user touches the touch panel (11).

In this aspect, the "threshold" is a threshold for determining the presence of input, and may be, for example, a fixed value, a value changed by a user, or a value changed in accordance with a touch operation to the touch panel (11).

"To change a threshold in accordance with a touch operation to the touch panel (11)" means, as an example, in a situation in which multiple touches are performed, a change to increase the threshold than a threshold in a situation in which multiple touches are not performed.

Supplemental Note 3

In a recording medium according to another aspect of the present invention, in the recording medium according to the supplemental note 1, the input presence determiner (146) is configured to determine, based on a speed of a change in the pressure indicated by the pressure information, whether the input is present.

A state in which the speed of a change in the pressure applied to the touch panel (11) becomes equal to or greater than a certain value is assumed to be a state in which a user is inputting some kind of instruction to the touch panel (11). Therefore, according to the present aspect, it can be determined whether input of an instruction regarding the game is present, on the basis of the speed of a change in the pressure indicated by the pressure information.

Supplemental Note 4

In a recording medium according to another aspect of the present invention, in the recording medium according to any one of the supplemental notes 1 to 3, the touch panel (11) includes an operation area (R) for the input, and the instruction determiner (147) is configured to determine, based on a positional relationship between the touch position and the operation area (R), the direction regarding the game indicated by the instruction.

According to the present aspect, a user can set contents of the instruction regarding the game in accordance with the positional relationship between the touch position and the operation area (R).

In this aspect, the "operation area" is an example of an area for receiving an operation, and may be, for example, an area provided in a mode visible on the touch panel (11), in order to input an instruction regarding the game, or may be a virtual area provided in a mode not visible on the touch panel (11) in order to input an instruction regarding the game.

The "area provided in a mode visible on the touch panel (11)" may be, for example, a virtual direction key for upward, downward, rightward, and leftward directions displayed on the touch panel (11) or a virtual cross key displayed on the touch panel (11).

The "direction key for upward, downward, rightward, and leftward directions" may have an up key for specifying an upward direction, a down key for specifying a downward direction, a right key for specifying a rightward direction, and a left key for specifying a leftward direction.

In this case, the up key, the down key, the right key, and the left key may come in contact with each other, or may be arranged with a gap therebetween.

Supplemental Note 5

In a recording medium according to another aspect of the present invention, in the recording medium according to the supplemental note 4, the program causes the processor (14) to further function as a setter (142) configured to set the operation area (R) at a position on the touch panel based on the touch position indicated by the touch position information.

According to the present aspect, the operation area (R) is set at a position based on the touch position. Therefore, the operation area (R) can be set at a position where a user can easily operate the operation area (R).

Supplemental Note 6

In a recording medium according to another aspect of the present invention, in the recording medium according to the supplemental note 5, the setter (142) sets, when the determination result by the input presence determiner (146) is negative, the operation area (R) at the position on the touch panel (11) based on the touch position indicated by the touch position information.

According to the present aspect, in a state in which a user is not inputting an instruction regarding the game, even if a touch position deviates from the operation area (R), the position of the operation area (R) can be moved in accordance with the touch position. Therefore, input of an instruction to the operation area (R) can be easily performed, as compared to a configuration in which the position of the operation area (R) does not move in accordance with movement of the touch position.

Supplemental Note 7

In a recording medium according to another aspect of the present invention, in the recording medium according to the supplemental note 5 or 6, the program causes the processor (14) to further function as a detector (149) configured to detect, based on the touch position information or the pressure information, a change in a state from a first state in which a touch to the touch panel (11) is not present to a second state in which the touch to the touch panel (11) is present, wherein when the detector (149) detects the change in a state from the first state to the second state, the setter (142) is configured to set the operation area (R) at the position on the touch panel (11) based on the touch position indicated by the touch position information.

According to the present aspect, when a touch-in to the touch panel (11) occurs, the operation area (R) corresponding to the touched-in position can be set. Therefore, when a user touches-in, the user can align the positions of the thumb (F) and the operation area (R) with each other, without being aware of the position of the operation area (R).

Supplemental Note 8

In a recording medium according to another aspect of the present invention, in the recording medium according to any one of the supplemental notes 5 to 7, the setter (142) is configured to set, based on both the pressure information and the touch position indicated by the touch position information, the operation area (R) on the touch panel (11).

For example, when a user changes a touch position on the touch panel (11) by tilting the thumb (F) that touches the touch panel (11), as the tilt of the thumb (F) increases, the pressure applied to the touch panel (11) increases. Furthermore, as the tilt of the thumb (F) increases, the touch position becomes away from the touch position at a time when the thumb (F) is not tilted.

According to the present aspect, the position of the operation area (R) on the touch panel (11) is set based on the touch position and the pressure information. Therefore, for example, the operation area (R) can be set at a position away from the touch position by a distance according to the pressure indicated by the pressure information. Therefore, in a situation in which a user is performing an operation to change the touch position on the touch panel (11) by tilting the thumb (F) that touches the touch panel (11), the operation area (R) can be set based on the touch position at a time when the thumb (F) is not tilted.

Supplemental Note 9

In a recording medium according to another aspect of the present invention, in the recording medium according to any one of the supplemental notes 1 to 3, the instruction determiner (147) in configured to determine, based on a change in the touch position indicated by the touch position information, the direction regarding the game indicated by the instruction.

According to the present aspect, even if the operation area (R) is not set, an instruction regarding the game can be input.

In this aspect, the "change in a touch position" may be, for example, a change in a touch position in a period including a time point at which the input presence determiner (146) determines that the input is present, or may be a change in a touch position in a period not including the time point at which the input presence determiner (146) determines that the input is present (for example, a period started within a predetermined time from a time point of performing the determination).

The "period including a time point at which the input presence determiner (146) determines that the input is present" may be, for example, a period ending at the time point at which the input presence determiner (146) determines that the input is present, a period starting from the time point at which the input presence determiner (146) determines that the input is present, or a period started before the time point at which the input presence determiner (146) determines that the input is present and ending after the time point at which the input presence determiner (146) determines that the input is present.

In this aspect, for example, the instruction determiner (147) may determine the change direction of a touch position as the direction regarding the game indicated by an instruction, or may determine the direction obtained by rotating the change direction of the touch position by a predetermined angle as the direction regarding the game indicated by an instruction.

Supplemental Note 10

In a recording medium according to another aspect of the present invention, in the recording medium according to the supplemental note 9, the instruction determiner (147) is configured to determine, based on a change in the touch position in a period including a time point at which the input presence determiner (146) determines that the input is present, the direction regarding the game indicated by the instruction.

The time point at which the input presence determiner (146) determines that the input of an instruction regarding the game is present can be considered as a time point at which an instruction regarding the game is being input.

Therefore, according to the present aspect, a direction regarding the game instructed by an instruction regarding the game can be determined in response to input of the instruction regarding the game.

In this aspect, the "period including a time point at which the input presence determiner (146) determines that input is present" may be, for example, a period ending at a time point at which the input presence determiner (146) determines that the input is present, a period starting from the time point at which the input presence determiner (146) determines that the input is present, or a period started before the time point at which the input presence determiner (146) determines that the input is present and ending after the time point at which the input presence determiner (146) determines that the input is present.

Supplemental Note 11

In a recording medium according to another aspect of the present invention, in the recording medium according to any one of the supplemental notes 1 to 10, the program causes the processor (14) to function as a vibration controller (148) configured to vibrate the touch panel (11), when the direction regarding the game indicated by the instruction changes.

According to the present aspect, a user can intuitively recognize a change of the instruction regarding the game by vibration of the touch panel (11).

Supplemental Note 12

In a recording medium according to another aspect of the present invention, in the recording medium according to the supplemental note 11, the touch panel includes an operation area for the input, and the vibration controller is configured to vibrate the touch panel when the touch position passes a boundary of the operation area.

According to the present aspect, a user can intuitively recognize that the touch position has passed a boundary of the operation area (R) by the vibration of the touch panel (11).

Supplemental Note 13

In a recording medium according to another aspect of the present invention, in the recording medium according to any one of the supplemental notes 1 to 12, the program causes the processor (14) to further function as a display controller (143) configured to display information regarding a determination result by the instruction determiner (147) on the touch panel (11).

According to the present aspect, a user can visually recognize an input result of an instruction regarding the game.

Supplemental Note 14

An information processing apparatus (10) according to another aspect of the present invention includes a touch position information acquirer (144) configured to acquire touch position information regarding a touch position on a touch panel (11), a pressure information acquirer (145) configured to acquire pressure information regarding a pressure applied to the touch panel (11), an input presence determiner (146) configured to determine, based on the pressure information acquired by the pressure information acquirer (145), whether input of an instruction regarding a game is present, and an instruction determiner (147) configured to determine a direction regarding the game indicated by the instruction, based on the touch position information acquired by the touch position information acquirer (144), when a determination result by the input presence determiner (146) is affirmative.

According to the present aspect, it is determined whether input of an instruction regarding the game is present, based on the pressure applied to the touch panel (11). Therefore, a user can realize a state in which no input of an instruction regarding the game is present by adjusting the pressure applied to the touch panel (11), even if the user touches the touch panel (11). Therefore, erroneous input based on a touch to a position not intended by the user can be reduced. Furthermore, the user can realize a state in which an instruction regarding the game is input, without performing a motion requiring load such as releasing the thumb (F) from the touch panel (11).

Supplemental Note 15

A recording medium according to one aspect of the present invention has recorded therein a program that causes a processor (14) to function as a touch position information acquirer (144) configured to acquire touch position information regarding a touch position on a touch panel (11), the touch panel including a first area (Rb) for inputting a first instruction regarding a game and a second area (Ra) for inputting a second instruction regarding the game, a pressure information acquirer (145) configured to acquire pressure information regarding a pressure applied to the touch panel (11), a first determiner (146A1) configured to determine, based on the touch position information acquired by the touch position information acquirer (144), whether input of the first instruction is present, and a second determiner (146A2) configured to determine whether input of the second instruction is present, based on both the pressure information, which is acquired by the pressure information acquirer (145) at a time when the touch position information acquired by the touch position information acquirer (144) indicates that a touch to the second area (Ra) is present, and a determination result by the first determiner (146A1) based on the touch position information.

According to the present aspect, a state indicating whether multiple touches are occurring with respect to the first area (Rb) and the second area (Ra) is used to determine whether input of the second instruction is present.

Therefore, occurrence of an error can be prevented in a determination operation regarding the second instruction in a state in which multiple touches are occurring, as compared to a configuration in which it is determined whether input of the second instruction is present without taking occurrence of multiple touches into consideration. Therefore, the function of the UI can be enhanced, in other words, the function of the UI can be improved.

In this aspect, the "first instruction" may be, for example, an instruction regarding a motion of a virtual object (a game element related to the progress of the game) that is present in a virtual space related to the game, or an instruction of a direction regarding the game.

The "virtual object present in a virtual space related to a game" is, for example, a character or an object of the game, or a virtual camera that takes a picture of the virtual space.

The "motion of a virtual object" may be, for example, an attack motion of the character, or a defense motion of the character, when the virtual object is a character of the game.

The "direction regarding a game" may be, for example, a direction in the virtual space related to the game, or a direction on a screen on which an image of the game is displayed.

The "direction in a virtual space related to a game" is, for example, a direction of a change in one or both of a position and a posture of a virtual object in the virtual space related to the game (a game element related to the progress of the game).

The "direction on a screen on which an image of a game is displayed" may be, for example, a direction of change in one or both of the position and the posture the virtual object displayed in the image of the game (a game element related to the progress of the game) in the screen, or a moving direction a pointer or the like (a game element not related to the progress of the game) displayed on the menu screen related to the game.

In this aspect, the "second instruction" may be, for example, an instruction of the direction regarding the game, or an instruction regarding a motion of the virtual object.

In this aspect, the "first area" is an area set on the touch panel (11), and is an example of an area for receiving the first instruction, and may be, for example, an area provided in a mode visible on the touch panel (11) for input of the first instruction, or may be a virtual area provided in a mode not visible on the touch panel (11) for input of the first instruction.

The "area provided in a mode visible on the touch panel (11)" is, for example, a virtual key displayed on the touch panel (11).

The virtual key may be, for example, a key for inputting an attack motion, or a key for inputting a defense motion.

In this aspect, the "second area" is an area different from the first area set on the touch panel (11), and is an example of an area for receiving the second instruction, and may be, for example, an area provided in a mode visible on the touch panel (11) for input of the second instruction, or may be a virtual area provided in a mode not visible on the touch panel (11) for input of the second instruction.

The "area provided in a mode visible on the touch panel (11)" may be, for example, a virtual direction key for upward, downward, rightward, and leftward directions displayed on the touch panel (11), or may be a virtual cross key displayed on the touch panel (11).

The "direction key for upward, downward, rightward, and leftward directions" may have an up key for specifying the upward direction, a down key for specifying the downward direction, a right key for specifying the rightward direction, and a left key for specifying the leftward direction.

In this case, the up key, the down key, the right key, and the left key may come in contact with each other, or may be arranged with a gap therebetween.

Supplemental Note 16

In a recording medium according to another aspect of the present invention, in the recording medium according to the supplemental note 15, in a situation in which the touch position information indicates that the touch to the second area (Ra) is present during a period in which the determination result by the first determiner (146A1) is affirmative, the second determiner (146A2) is configured to determine that the input of the second instruction is present, when the pressure, which is indicated by the pressure information acquired by the pressure information acquirer (145) at a time when the touch position information acquirer (144) acquires the touch position information indicative, is equal to or greater than a first reference value. In a situation in which the determination result by the first determiner (146A1) based on the touch position information indicative of the presence of the touch to the second area (Ra) is negative, the second determiner (146A2) is configured to determine that the input of the second instruction is present, when the pressure, which is indicated by the pressure information acquired by the pressure information acquirer (145) at the time when the touch position information acquirer (144) acquires the touch position information indicative of the presence of the touch to the second area, is equal to or greater than a second reference value that is less than the first reference value.

According to the present aspect, in a case in which multiple touches are not occurring, when the pressure indicated by the pressure information is equal to or greater than the second reference value, it is determined that the input of the second instruction is present. In a case in which multiple touches are occurring, when the pressure indicated by the pressure information is equal to or greater than the first reference value, which is greater than the second reference value, it is determined that the input of the second instruction is present.

Thus, when multiple touches are occurring, it is difficult to determine whether the input of the second instruction is present as compared to a case in which multiple touches are not occurring. Accordingly, for example, it is possible to avoid a pressure associated with input of the first instruction being determined as a pressure associated with input of the second instruction. Therefore, it is possible to avoid to erroneously determine that the input of the second instruction is present, although no input of the second instruction is present.

Supplemental Note 17

A recording medium according to another aspect of the present invention has recorded therein a program that causes a processor (11) to function as a touch position information acquirer (144) configured to acquire touch position information regarding a touch position on a touch panel (11), the touch panel including a first area (Rb) for inputting a first instruction regarding a game and a second area (Ra) for inputting a second instruction regarding the game, a pressure information acquirer (145) configured to acquire pressure information regarding a pressure applied to the touch panel (11), a first determiner (146A1) configured to determine, based on the touch position information acquired by the touch position information acquirer (144), whether input of the first instruction is present, and a second determiner (146A2) configured to determine, when a determination result by the first determiner (146A1) based on the touch position information indicative of a presence of a touch to the second area (Ra) is negative, whether input of the second instruction is present, based on the pressure information acquired by the pressure information acquirer (145) at a time when the touch position information acquirer (144) acquires the touch position information. The game is not affected by the touch to the second area, during a period in which the determination result by the first determiner (146A1) based on the touch position information indicative of the presence of the touch to the second area (Ra) is affirmative.

According to the present aspect, during a period in which no touch to the first area (Rb) is present, it is determined whether input of a second instruction is present, on the basis of the pressure indicated by the pressure information. During a period in which a touch to the first area (Rb) is present, the game is not affected by a touch to the second area (Ra). Therefore, even if multiple touches occur, it is possible to avoid the game being affected by a motion associated with the second instruction.

Supplemental Note 18

In a recording medium according to another aspect of the present invention, in the recording medium according to any one of supplemental notes 15 to 17, the program causes the processor (14) to further function as an instruction determiner (147) configured to determine a direction regarding the game indicated by the second instruction, based on the touch position information indicative of the presence of the touch to the second area (Ra) acquired by the touch position information acquirer (144), when a determination result by the second determiner (146A2) is affirmative.

According to the present aspect, when it is determined that input of the second instruction is present in a situation in which multiple touches is taken into consideration, a direction regarding the game indicated by the second instruction can be determined. Therefore, it is possible to avoid a determination operation of the direction regarding the game indicated by the second instruction being affected by multiple touches.

Supplemental Note 19

In a recording medium according to another aspect of the present invention, in the recording medium according to the supplemental note 18, the game is not affected by the second instruction, during a period in which the determination result by the first determiner (146A1) based on the touch position information indicative of the touch to the second area (Ra) is affirmative.

According to the present aspect, during a period in which a touch to the first area (Rb) is present, the game is not affected by the second instruction. Therefore, even if multiple touches occur, it is possible to avoid the game being affected by the second instruction.

Supplemental Note 20

In a recording medium according to another aspect of the present invention, in the recording medium according to the supplemental note 18 or 19, the program causes the processor (14) to further function as a vibration controller (148) configured to vibrate the touch panel (11), in at least one of a situation in which the determination result by the second determiner (146A2) changes or a situation in which a determination result by the instruction determiner (147) changes.

According to the present aspect, a user can intuitively recognize a change of the second instruction regarding the game by the vibration of the touch panel (11).

Supplemental Note 21

In a recording medium according to another aspect of the present invention, in the recording medium according to any one of the supplemental notes 18 to 20, the program causes the processor (14) to further function as a display controller (143) that displays information regarding a determination result by the instruction determiner (147) on the touch panel (11).

According to the present aspect, a user can visually recognize an input result of an instruction regarding the game.

Supplemental Note 22 An information processing apparatus (10) according to another aspect of the present invention includes a touch position information acquirer (144) configured to acquire touch position information regarding a touch position on a touch panel (11), the touch panel including a first area (Rb) for inputting a first instruction regarding a game and a second area (Ra) for inputting a second instruction regarding the game, a pressure information acquirer (145) configured to acquire pressure information regarding a pressure applied to the touch panel (11), a first determiner (146A1) configured to determine, based on the touch position information acquired by the touch position information acquirer (144), whether input of the first instruction is present, and a second determiner (146A2) configured to determine whether input of the second instruction is present, based on both the pressure information, which is acquired by the pressure information acquirer (145) at a time when the touch position information acquired by the touch position information acquirer (144) indicates that a touch to the second area (Ra) is present, and a determination result by the first determiner (146A1) based on the touch position information.

According to the present aspect, a state indicating whether multiple touches are occurring to the first area (Rb) and the second area (Ra) is used to determine whether input of the second instruction is present.

Therefore, erroneous determination can be prevented in determination regarding the second instruction in a state in which multiple touches are occurring, as compared to a configuration in which it is determined whether input of the second instruction is present without taking into consideration that multiple touches are occurring.

Supplemental Note 23

An information processing apparatus (10) according to another aspect of the present invention includes a touch position information acquirer (144) configured to acquire touch position information regarding a touch position on a touch panel (11), the touch panel including a first area (Rb) for inputting a first instruction regarding a game and a second area (Ra) for inputting a second instruction regarding the game, a pressure information acquirer (145) configured to acquire pressure information regarding a pressure applied to the touch panel (11), a first determiner (146A1) configured to determine, based on the touch position information acquired by the touch position information acquirer (144), whether input of the first instruction is present, and a second determiner (146A2) configured to determine, when a determination result by the first determiner (146A1) based on the touch position information indicative of a presence of a touch to the second area (Ra) is negative, whether input of the second instruction is present based on the pressure information acquired by the pressure information acquirer (145) at the time when the touch position information acquirer (144) acquires the touch position information, and to suspend determination of whether input of the second instruction is present, during a period in which the determination result by the first determiner (146A1) based on the touch position information indicative of the presence of the touch to the second area (Ra) is affirmative.

According to the present aspect, during a period in which no touch to the first area (Rb) is present, it is determined whether input of the second instruction is present based on the pressure indicated by the pressure information, and during a period in which a touch to the first area (Rb) is present, the game is not affected by the touch. Therefore, even if multiple touches occur, it is possible to avoid the game being affected by the second instruction.

DESCRIPTION OF REFERENCE SIGNS

10 . . . information processing apparatus, 11 . . . touch panel, 12 . . . pressure detector, 13 . . . vibrator, 14 . . . controller, 15 . . . storage device, 141 . . . game controller, 142 . . . setter, 143 . . . display controller, 144 . . . touch position information acquirer, 145 . . . pressure information acquirer, 146, 146A . . . input presence determiner, 146A1 . . . first input presence determiner, 146A2 . . . second input presence determiner, 147 . . . instruction determiner, 148 . . . vibration controller, 149 . . . detector, 1401 . . . touch information acquirer, 1402 . . . determiner, 1403 . . . right-and-left determination area setter.

What is claimed is:

1. A non-transitory computer-readable recording medium having recorded therein a program for causing a processor to function as:
   a touch position information acquirer configured to acquire touch position information regarding a touch position on a touch panel, the touch panel including a first area for inputting a first instruction regarding a game and a second area for inputting a second instruction regarding the game;
   a pressure information acquirer configured to acquire pressure information regarding a pressure applied to the touch panel;
   a first determiner configured to determine, based on the touch position information acquired by the touch position information acquirer, whether input of the first instruction is present; and
   a second determiner configured to, in response to a result determined by the first determiner being negative, determine, based on the pressure information, whether input of the second instruction is present, the result being determined by the first determiner based on the touch position information indicative of at least a presence of a touch to the second area, the pressure information being acquired by the pressure information acquirer at a point in time at which the touch position information acquirer acquires the touch position information indicative of at least the presence of the touch to the second area,
   wherein the game is not affected by the touch to the second area, during a period in which the determination result by the first determiner based on the touch position information indicative of at least the presence of the touch to the second area is affirmative.

2. The recording medium according to claim 1, wherein the program causes the processor to further function as
   an instruction determiner configured to determine a direction regarding the game indicated by the second instruction, based on the touch position information indicative of the presence of the touch to the second area acquired by the touch position information acquirer, in response to a determination result by the second determiner being affirmative.

3. The recording medium according to claim 2, wherein the game is not affected by the second instruction, during a period in which the determination result by the first determiner based on the touch position information indicative of the presence of the touch to the second area is affirmative.

4. The recording medium according to claim 2, wherein the program causes the processor to further function as
   a vibration controller configured to vibrate the touch panel, in at least one of a situation in which the determination result by the second determiner changes or a situation in which a determination result by the instruction determiner changes.

5. The recording medium according to claim 2, wherein the program causes the processor to further function as
   a display controller configured to display information regarding a determination result by the instruction determiner on the touch panel.

* * * * *